US010873412B2

(12) United States Patent
Huang et al.

(10) Patent No.: US 10,873,412 B2
(45) Date of Patent: Dec. 22, 2020

(54) SYSTEM AND METHOD FOR REAL-TIME OPTIMIZED SCHEDULING FOR NETWORK DATA TRANSMISSION

(71) Applicant: Virginia Tech Intellectual Properties, Inc., Blacksburg, VA (US)

(72) Inventors: Yan Huang, Blacksburg, VA (US); Y. Thomas Hou, Blacksburg, VA (US); Yongce Chen, Blacksburg, VA (US)

(73) Assignee: Virginia Polytechnic Institute and State University, Blacksburg, VA (US)

( * ) Notice: Subject to any disclaimer, the term of this patent is extended or adjusted under 35 U.S.C. 154(b) by 0 days.

(21) Appl. No.: 16/039,486

(22) Filed: Jul. 19, 2018

(65) Prior Publication Data

US 2019/0036639 A1  Jan. 31, 2019

Related U.S. Application Data

(63) Continuation of application No. PCT/EP2016/080853, filed on Jul. 18, 2018.

(60) Provisional application No. 62/537,733, filed on Jul. 27, 2017.

(51) Int. Cl.
| | |
|---|---|
| *H04L 1/00* | (2006.01) |
| *H04L 5/00* | (2006.01) |
| *H04W 72/04* | (2009.01) |

(52) U.S. Cl.
CPC .......... *H04L 1/0003* (2013.01); *H04L 1/0009* (2013.01); *H04L 1/0015* (2013.01); *H04L 1/0026* (2013.01); *H04L 5/003* (2013.01); *H04L 5/0053* (2013.01); *H04L 2001/0093* (2013.01); *H04W 72/0453* (2013.01)

(58) Field of Classification Search
CPC ........................................................ G06F 9/46
See application file for complete search history.

(56) References Cited

U.S. PATENT DOCUMENTS

| | | | |
|---|---|---|---|
| 2008/0244584 A1* | 10/2008 | Smith ................... | G06Q 10/06 718/102 |
| 2012/0294161 A1 | 11/2012 | Sunay et al. | |
| 2015/0244430 A1 | 8/2015 | Shattil | |

(Continued)

OTHER PUBLICATIONS

Written Opinion/Search Report for PCT/US2018/042730 dated Oct. 2, 2018.

*Primary Examiner* — Sulaiman Nooristany
(74) *Attorney, Agent, or Firm* — Blank Rome LLP

(57) ABSTRACT

System and method for using a network with base stations to optimally or near-optimally schedule radio resources among the users are disclosed. In certain embodiments the system and method are designed to operate in real-time (such as but not limited to 100 μs) to schedule radio resources in a 5G NR network by solving for an optimal or near-optimal solution to scheduling problem by decomposing it into a number of small and independent sub-problems, selecting a subset of sub-problems and fitting them into a number of parallel processing cores from one or multiple many-core computing devices, and solving for an optimal or near-optimal solution through parallel processing within approximately 100 μs. In other embodiments, the sub-problems are constructed to have a similar mathematical structure. In yet other embodiments, the sub-problems are constructed to each be solved within approximately 10 s of μs.

16 Claims, 11 Drawing Sheets

(56) References Cited

U.S. PATENT DOCUMENTS

2016/0183276 A1    6/2016  Marinier et al.
2018/0132200 A1*   5/2018  Gheorghiu .......... H04W 88/027
2018/0192449 A1*   7/2018  Mueck ................. H04L 1/0003

* cited by examiner

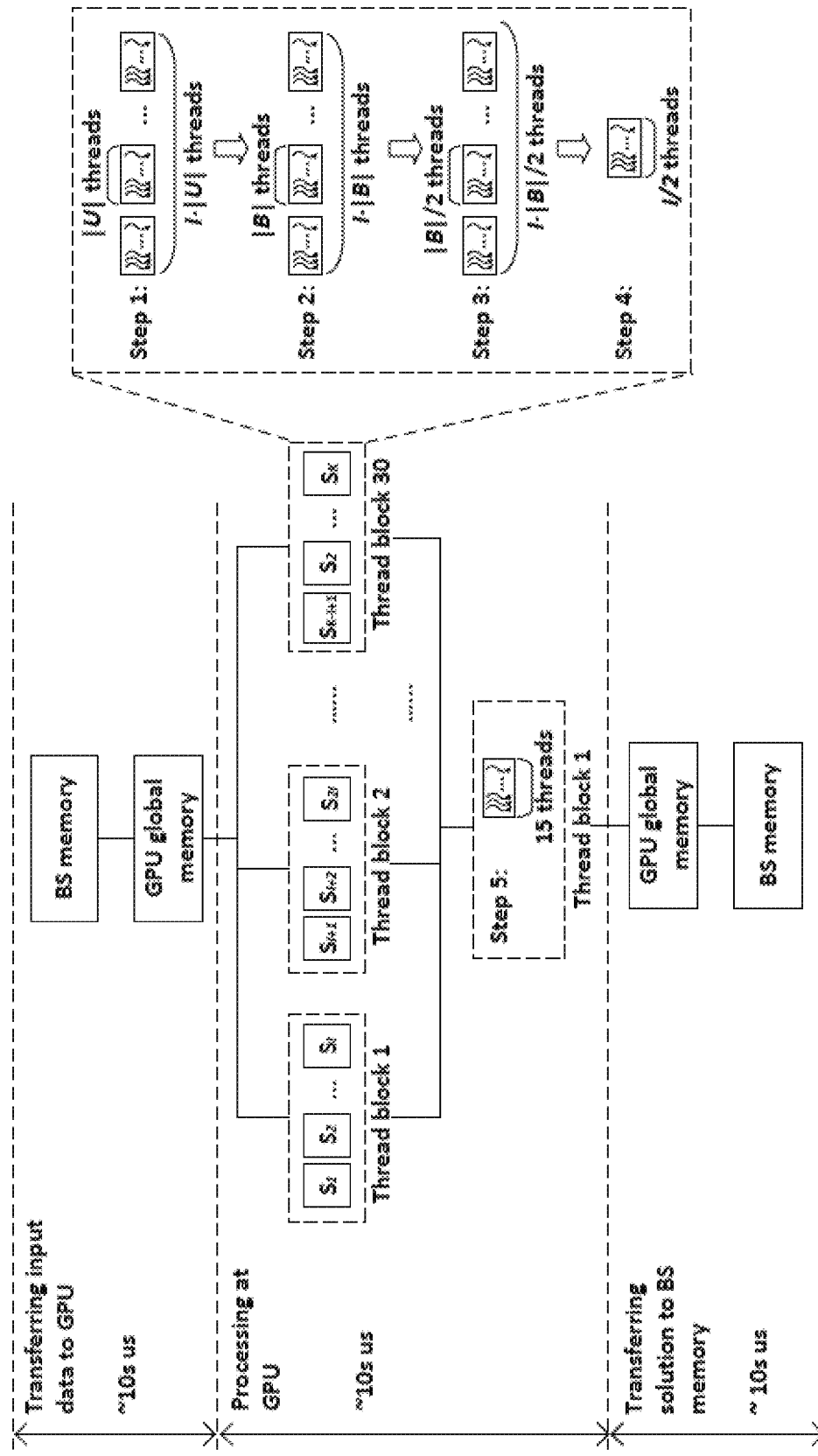

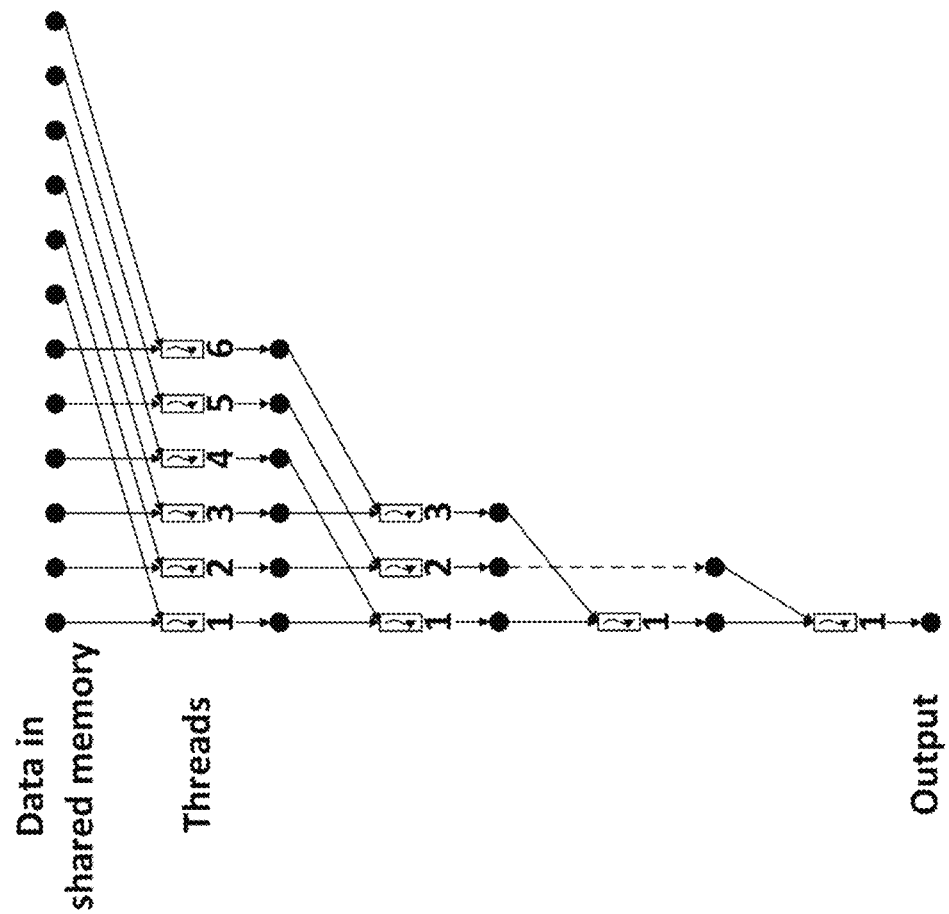

SYSTEM AND METHOD FOR REAL-TIME OPTIMIZED SCHEDULING FOR NETWORK DATA TRANSMISSION

CROSS-REFERENCE TO RELATED APPLICATIONS

This application is a continuation of International Application No PCT/US18/42730, filed Jul. 18, 2018, which claims benefit of U.S. Provisional Application No. 62/537,733, filed Jul. 27, 2017, which is incorporated herein in its entirety.

GOVERNMENT LICENSE RIGHTS

This invention was made with government support under Grant Nos. CNS-1343222 and CNS-1642873 awarded by the National Science Foundation. The government has certain rights in the invention.

FIELD OF THE INVENTION

The present invention relates to system and method for schedulers for cellular networks.

BACKGROUND OF THE INVENTION

As the next-generation cellular communication technology, 5G New Radio (NR) aims to cover a wide range of service cases, including broadband human-oriented communications, time-sensitive applications with ultra-low latency, and massive connectivity for Internet of Things [4]. With its broad range of operating frequencies from sub-GHz to 100 GHz [8], the channel coherence time for NR varies greatly. Comparing to LTE, which typically operates on bands lower than 3 GHz [12] and with a coherence time over 1 millisecond (ms), NR is likely to operate on higher frequency range (e.g., 3 to 6 GHz), with much shorter coherence time (e.g., ~200 s microsecond ($\mu$s)). Further, from application's perspective, 5G NR is expected to support applications with ultra-low latency (e.g., augmented/virtual reality, autonomous vehicles [10]), which call for sub-millisecond time resolution for scheduling.

With such diverse service cases and channel conditions, the air interface design of NR must be much more flexible and scalable than that of LTEs [1]. To address such needs, a number of different OFDM numerologies are defined for NR [6], allowing a wide range of frequency and time granularities for data transmission. Instead of a single transmission time interval (TTI) of 1 ms as for LTE, NR allows 4 numerologies (0, 1, 2, 3) for data transmission (with numerology 4 for control signaling) [9], with TTI varying from 1 ms to 125 $\mu$s [5]. In particular, numerology 3 allows NR to cope with extremely short channel coherence time and to meet the stringent requirement in extreme low-latency applications, where the scheduling resolution is ~100 $\mu$s.

But the new ~100 $\mu$s time requirement also poses a new challenge to the design of an NR scheduler. To concretize our discussion, we use the most popular proportional-fair (PF) scheduling as an example [19-22]. Within each scheduling time interval, a PF scheduler needs to decide how to allocate frequency-time resource blocks (RBs) to users and determine modulation and coding scheme (MCS) for each user. The objective of a PF scheduler is to maximize the sum of logarithmic (long-term) average rates of all users. An important constraint is that each user can only use one MCS (from a set of allowed MCSs) across all RBs that are allocated to her. This problem is found to be NP hard [20-22] and has been widely studied in the literature. Although some of the existing approaches could offer a scheduling solution on a much larger time scale, none of these PF schedulers can offer a solution close to 100 $\mu$s. In [19], Kwan et al. formulated the PF scheduling problem as an integer linear programming (ILP) and proposed to solve it using branch-and-bound technique, which has exponential computational complexity due to its exhaustive search. Some polynomial-time PF schedulers that were designed using efficient heuristics can be found in [20-22]. We will examine the computational complexity and real-time computational time of these schedulers in "The Real-Time Challenge for NR PF Scheduler" section. A common feature of these PF schedulers (designed for LTE) is that they are all of sequential designs and need to go through a large number of iterations to determine a solution. Although they may meet the scheduling timing requirement for LTE (1 ms), none of them comes close to meet the new ~100 $\mu$s timing requirement for 5G NR.

This invention is a novel design of a parallel PF scheduler using off-the-shelf GPU to achieve ~100 $\mu$s scheduling resolution. We name this new design "GPF", which is the abbreviation of GPU-based PF scheduler. The key ideas of GPF are: (i) to decompose the original PF scheduling problem into a large number of small and independent sub-problems with similar structure, where each sub-problem can be solved within very few number of iterations; (ii) to identify and select a subset of promising sub-problems through intensification and fit them into the massive parallel processing cores of a GPU.

In the literature, there have been a number of studies applying GPUs in networking [23-25] and signal processing for wireless communications [26-28]. The authors of [23] proposed PacketShader, which is a GPU-based software router that utilizes parallelism in packet processing to boost network throughput. The work in [24] applied GPU to network traffic indexing and is able to achieve an indexing throughput of over one million records per second. In [25], the authors designed a packet classifier that is optimized towards GPU's memory hierarchy and massive number of cores. All these previous works focus on network packet processing, which is fundamentally different from the resource scheduling problem that we consider. Authors of [26] proposed a parallel soft-output MIMO detector for GPU implementation. In [27], the authors designed GPU-based decoders for LDPC codes. The work in [28] addressed the implementation of a fully parallelized LTE Turbo decoder on GPU. These studies address baseband signal processing and their proposed approaches cannot be applied to solve a complex scheduling optimization problem like PF.

SUMMARY OF THE INVENTION

The objective of the invention is to disclose systems and methods for the first design of a PF scheduler for 5G NR that can meet the 100 $\mu$s timing requirement. This design can be used to support 5G NR numerology 0 to 3, which are to be used for data transmission. This is also the first design of a scheduler (for cellular networks) that exploits GPU platform. In particular, the invention uses commercial off-the-shelf GPU components and does not require any expensive custom-designed hardware.

Our GPU-based design is based on a successful decomposition of the original optimization problem into a large number of sub-problems through enumerating MCS assignments for all users. We show that for each sub-problem (with a given MCS assignment), the optimal RB allocation problem can be solved exactly and efficiently.

To reduce the number of sub-problems and fit them into the streaming microprocessors (SMs) in a GPU, we identify the most promising search space among the sub-problems by using intensification technique. By a simple random sampling of sub-problems from the promising subspace, we can find a near-optimal (if not optimal) solution.

We implement our invention, which is a GPU-based proportional-fair scheduler ("GPF scheduler" or "GPF"), on an off-the-shelf Nvidia Quadro P6000 GPU using the CUDA programming model. By optimizing the usage of streaming processors on the given GPU, minimizing memory access time on the GPU based on differences in memory types/locations, and reducing iterative operations by exploiting techniques such as parallel reduction, we are able to achieve overall scheduling time of GPF to 100 µs for a user population size of up to 100 for an NR macro-cell.

We conduct extensive experiments to investigate the performance of our GPF and compare it to three representative PF schedulers (designed for LTE). Experimental results show that our GPF can achieve near-optimal performance (per PF criterion) in about ~100 µs while the other schedulers would require much more time (ranging from many times to several orders of magnitude) and none of them can meet 100 µs time requirement.

By breaking down the time performance between data movement (CPU to/from GPU) and computation in GPU, we show that between 50% to 70% (depending on user population size) of the time is spent on data movement while less than half of the time is spent on GPU computation. This suggests that our invention (GPF) can achieve even better performance (e.g., <50 µs) if a customized GPU system (e.g., with enhanced bus interconnection such as the NVLink [34], or integrated host-GPU architecture [35-37]) is used for 5G NR base stations (BSs).

BRIEF DESCRIPTION OF THE FIGURES

FIG. 6 shows an illustration of the major tasks and steps in an exemplary embodiment of the invention;

FIG. 7 shows an illustration of parallel reduction in shared memory;

DETAILED DESCRIPTION OF THE PREFERRED EMBODIMENTS

Figure 1:
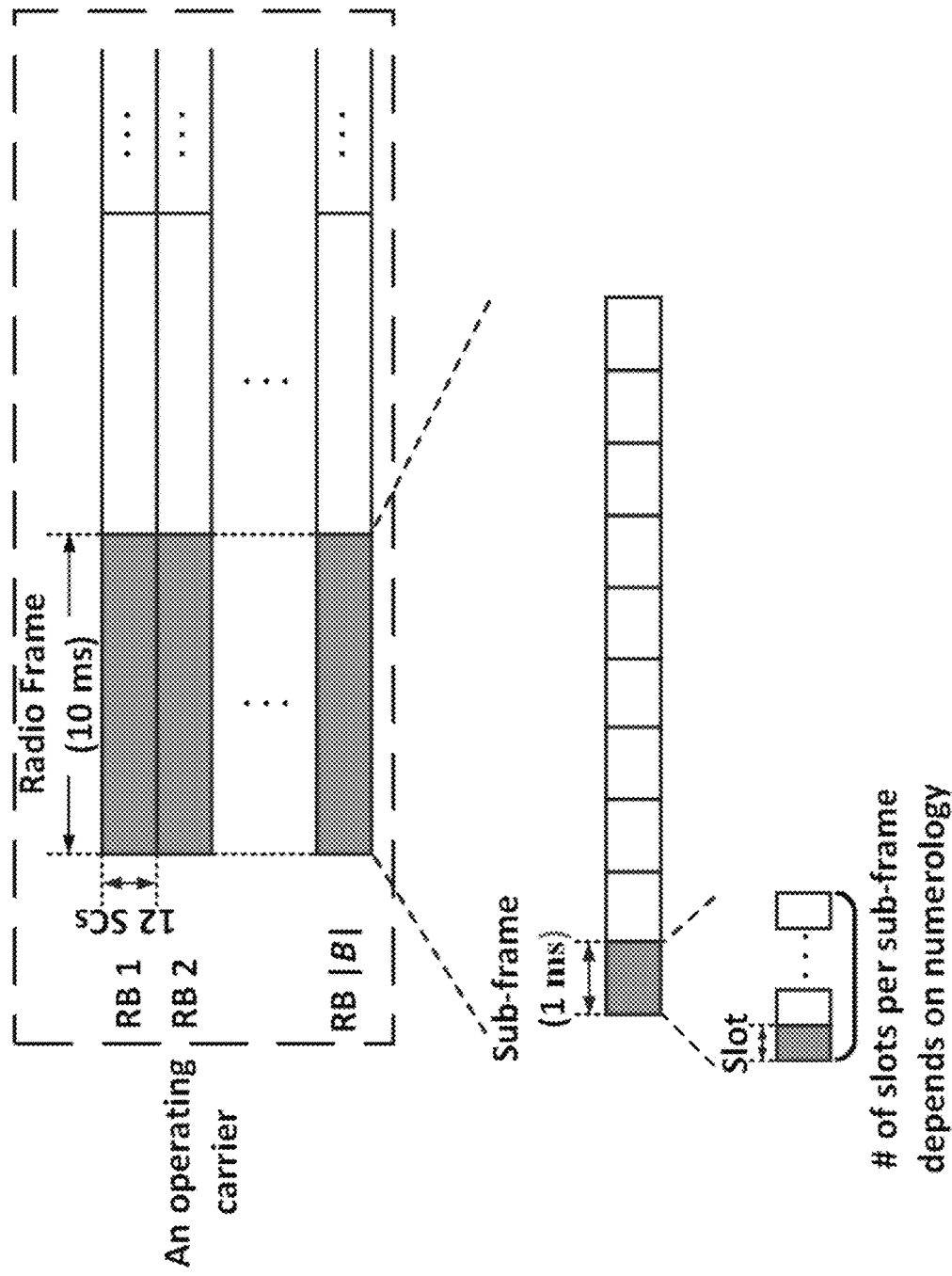
FIG. 1 shows an illustration of the frame structure on an NR operating carrier.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

Primer on NR Air Interface

Figure 2:
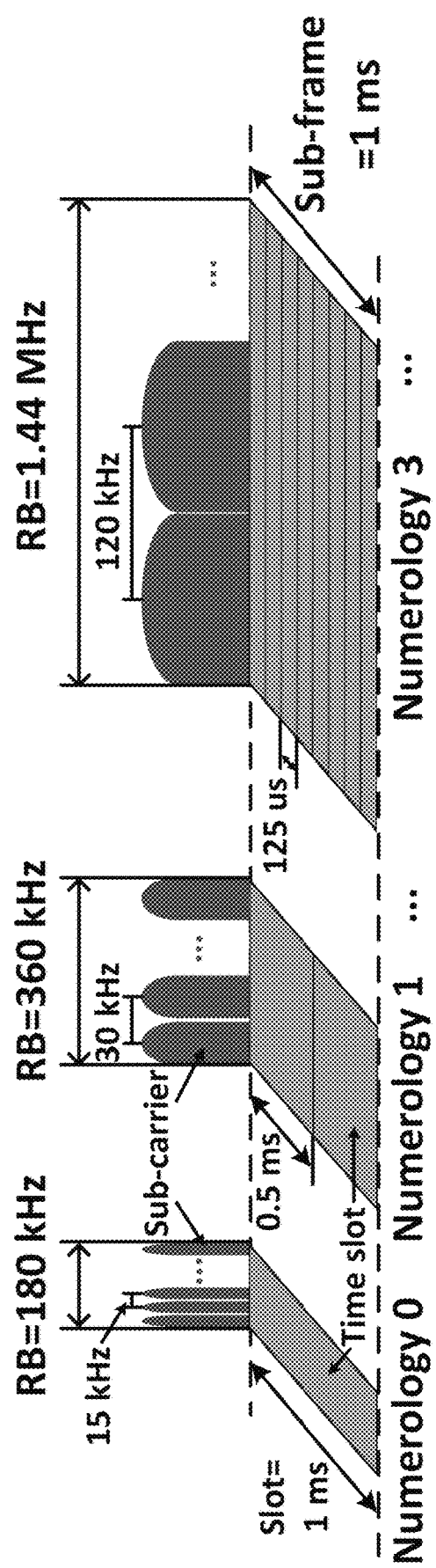
FIG. 2 shows an illustration of different OFDM numerologies of NR, characterizing both the time and frequency domains.

To meet diverse operating requirements, NR employs a much more flexible and scalable air interface than LTE [1]. The radio frame structure on an operating carrier of NR is illustrated in FIG. 1. In the frequency domain, NR still employs OFDM and the bandwidth of an operating carrier is divided into a number of sub-carriers (SC). In the time domain, each frame has 10 ms duration and consists of 10 sub-frames (SF), each with 1 ms duration. An SF may consist of one or multiple time slots. The number of time slots in an SF is defined by OFDM numerologies [6]. An illustration of time and frequency characteristics under different numerologies is given in FIG. 2. Table 1 (below) shows the SC spacing, number of time slots per SF, duration of each time slot and suitable frequency bands under each numerology. Since the number of OFDM symbols per slot is fixed to 14 in NR [6] under different SC spacing, the duration of a time slot becomes shorter when SC spacing increases. In current NR standards, numerology 4 is not supported for data transmission [9]. Thus this technology focuses on numerology 0 through 3.

TABLE 1

| OFDM Numerologies in NR [2, 6] | | | | |
|---|---|---|---|---|
| Numerology | SC Spacing | Slots/SF | Slot Duration | Suitable Bands |
| 0 | 15 kHz | 1 | 1000 μs | ≤6 GHz |
| 1 | 30 kHz | 2 | 500 μs | ≤6 GHz |
| 2 | 60 kHz | 4 | 250 μs | ≤6 GHz |
| 3 | 120 kHz | 8 | 125 μs | ≤6 GHz or ≥24 GHz |
| 4 | 240 kHz | 16 | 62.5 μs | ≥24 GHz |

At the base station, each scheduling time interval (or scheduling resolution) is called transmission time interval (TTI), and its duration can vary from several OFDM symbols (a mini-slot or sub-slot), one slot, to multiple slots. The choice of TTI depends on service and operational requirements [4]. In the frequency domain, the scheduling resolution is one RB, which consists of 12 consecutive SCs grouped together. Within each TTI, the base station needs to decide how to allocate (schedule) all the RBs for the next TTI to different users. Thus the channel coherence time should cover at least two TTIs.

Within a TTI, each RB can be allocated to one user while a user may be allocated with multiple RBs. The next question is what modulation and coding scheme (MCS) to use for each user. For 5G NR, 29 MCSs are available (more precisely, 31 MCS are defined, with 2 of them being reserved, leaving 29 MCS available) [7], each representing a combination of modulation and coding techniques. For a user allocated with multiple RBs, the BS must use the same MCS across all RBs allocated to this user [7]. Here, one codeword is considered per user. The analysis can be extended to cases where a user has two codewords by configuring the same MCS for both codewords. This requirement also applies to in LTE. The motivation behind this is that using different MCSs on RBs cannot provide a significant performance gain, but would require additional signaling overhead [14]. For each user, the choice of MCS for its allocated RBs depends on channel conditions. A scheduling decision within each TTI entails joint RB allocation to users and MCS assignment for the RBs.

A Formulation of the PF Scheduling Problem

Herein, a formulation of the classical PF scheduler under the NR framework is presented. Table 2 describes the notation used for the purposes of the following discussion.

TABLE 2

| Notation | |
|---|---|
| Symbol | Definition |
| $\mathcal{B}$ | The set of RBs |
| I | The number of sub-problems solved by a thread block |
| K | The total number of sub-problems solved in each TTI |
| $\mathcal{M}$ | The set of MCSs |
| $N_c$ | The time duration considered for PF in number of TTIs |
| $q_u^b(t)$ | The maximum level of MCS that user u's channel can support on RB b in TTI t |
| $q_u^{max}$ | The highest level of MCS that user u's, channel can support among all RBs |
| $Q_u^d$ | The set of d MCS levels near $q_u^{max}$ (inclusive) |
| $Q^d$ | The Cartesian of sets $Q_1^d, Q_2^d, \ldots, Q_{|u|}^d$ |
| $r^m$ | The per RB achievable data-rate with MCS m |
| $r_u^{b,m}(t)$ | The instantaneous achievable data-rate of user u on RB b with MCS m in TTI t |
| $R_u(t)$ | The aggregate achievable data-rate of user u in TTI t |
| $\bar{R}_u$ | The long-term average data-rate of user u |
| $\hat{R}_u(t)$ | The exponentially smoothed average data-rate of user u up to TTI t |
| $T_0$ | The duration of a TTI |

TABLE 2-continued

Notation

| Symbol | Definition |
|---|---|
| $\mathcal{U}$ | The set of users |
| W | Bandwidth of the channel |
| $W_0$ | = W/|$\mathcal{B}$|, bandwidth of a RB |
| $x_u^b(t)$ | The binary variable indicating whether or not RB b is allocated to user u in TTI t |
| $y_u^m(t)$ | The binary variable indicating whether or not MCS m is used for user u in TTI t |
| $z_u^{b,m}(t)$ | The variable introduced in OPT-R to replace the product $x_u^b(t)y_u^m(t)$ |

Mathematical Modeling and Formulation

Consider a 5G NR base station (BS) and a set U of users under its service. For scheduling at the BS, we focus on downlink (DL) direction (data transmissions from BS to all users) and consider a (worst case) full-buffer model, i.e., there is always data backlogged at the BS for each user. Denote W as the total DL bandwidth. Under OFDM, radio resource on this channel is organized as a two-dimensional frequency-time resource grid. In the frequency domain, the channel bandwidth is divided into a set B of RBs, each with bandwidth $W_0$=W/|B|. Due to frequency-selective channel fading, channel condition for a user varies across different RBs. For the same RB, channel conditions from the BS to different users also vary, due to the differences in their geographical locations. In the time domain, we have consecutive TTIs, each with a duration $T_0$. Scheduling decision at the BS must be made within the current TTI (before the start of the next TTI).

Denote $x_u^b(t) \in \{0, 1\}$ as a binary variable indicating whether or not RB b∈B is allocated to user u∈U in TTI t, i.e., $$x_u^b(t) = \begin{cases} 1, & \text{if } RB\ b \text{ is allocated to user } u \text{ in } TTI\ t, \\ 0, & \text{otherwise.} \end{cases} \quad (1)$$

Since each RB can be allocated at most to one user, we have:

$$\sum_{u \in \mathcal{U}} x_u^b(t) \leq 1, (b \in \mathcal{B}) \quad (2)$$

At the BS, there is a set M of MCSs that can be used by the transmitter for each user u∈ U at TTI t. When multiple RBs are allocated to the same user, then the same MCS, denoted m (m ∈ M), must be used across all these RBs. Denote $y_u^m(t) \in \{0, 1\}$ as a binary variable indicating whether or not MCS m∈M is used by the BS for user u∈U in TTI t, i.e., $$y_u^m(t) = \begin{cases} 1, & \text{if } MCS\ m \text{ is used for user } u \text{ in } TTI\ t, \\ 0, & \text{otherwise.} \end{cases} \quad (3)$$

Since only one MCS from M can be used by the BS for all RBs allocated to a user u∈U at t, we have:

$$\sum_{m \in M} y_u^m(t) \leq 1, (u \in \mathcal{U}). \quad (4)$$

Figure 3:
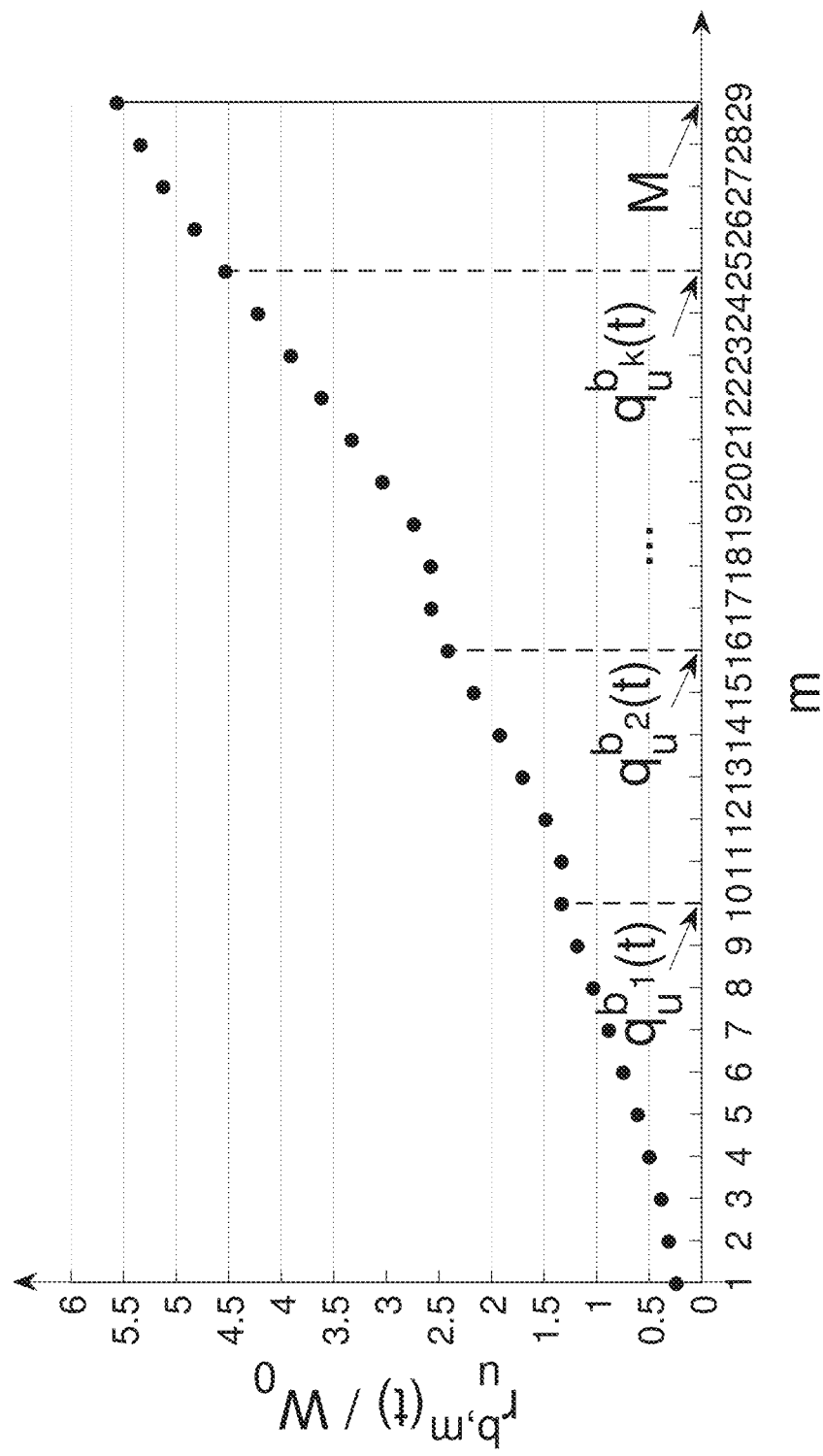
FIG. 3 shows a graph of spectral efficiencies corresponding to different levels of MCS. It also illustrates an example of a user u's achievable data rates for different RBs ($b_1$, $b_2$, ..., $b_k$). Data are from Table 5.1.3.1-1 in [7], with MCS levels 17 and 18 exchanged to ensure monotone increasing spectral efficiency property.
Figure 4A:
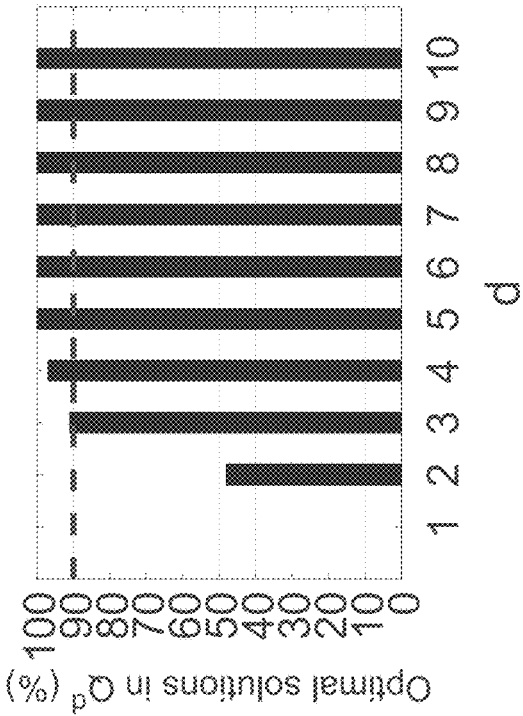
FIG. 4A shows the percentage of optimal solutions found in $Q^d$ as a function of d under user population size |U|=25.
Figure 4B:
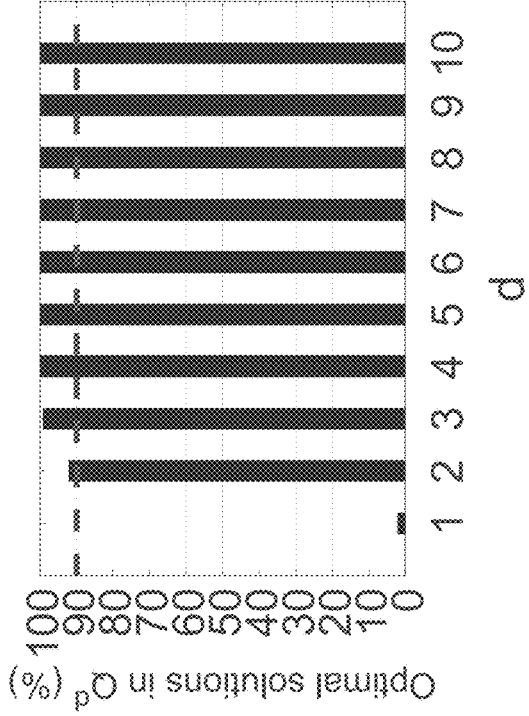
FIG. 4B shows the percentage of optimal solutions found in $Q^d$ as a function of d under user population size |U|=50.
Figure 4C:
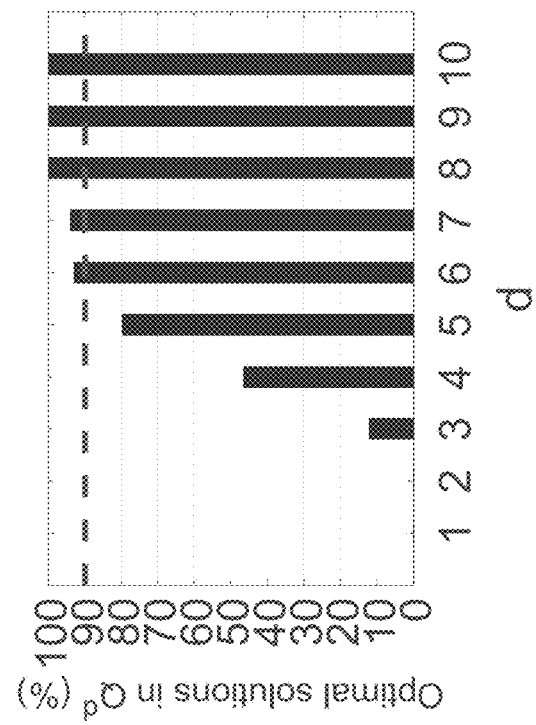
FIG. 4C shows the percentage of optimal solutions found in $Q^d$ as a function of d under user population size |U|=75.
Figure 4D:
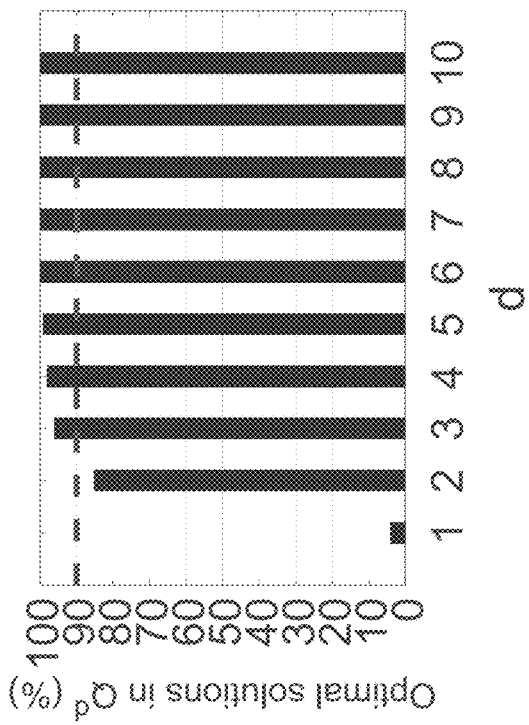
FIG. 4D shows the percentage of optimal solutions found in $Q^d$ as a function of d under user population size |U|=100.
Figure 5A:
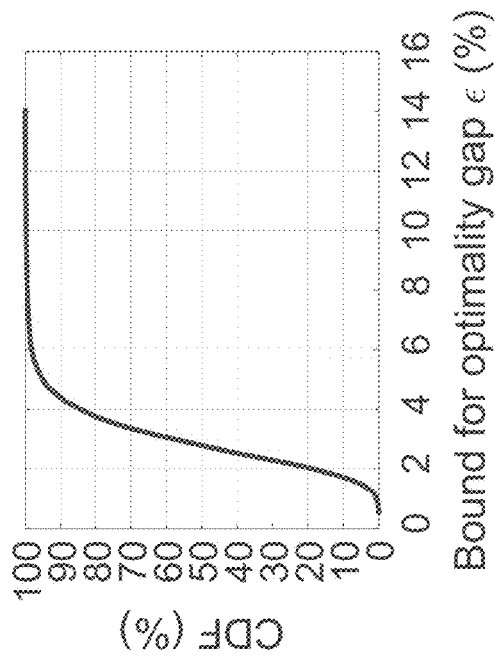
FIG. 5A shows, among the solutions to a set of sub-problems, the cumulative distribution function (CDF) of gaps (in percentage) between sub-problem solutions and optimal objective values for problem OPT-PF under user population size |U|=25.
Figure 5B:
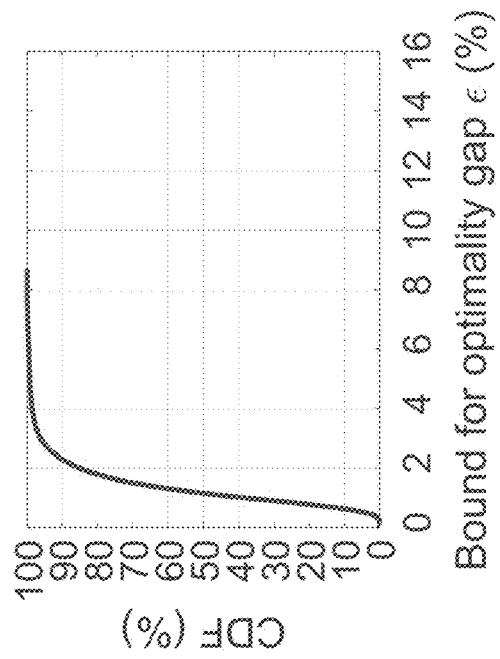
FIG. 5B shows, among the solutions to a set of sub-problems, the cumulative distribution function (CDF) of gaps (in percentage) between sub-problem solutions and optimal objective values for problem OPT-PF under user population size |U|=50.
Figure 5C:
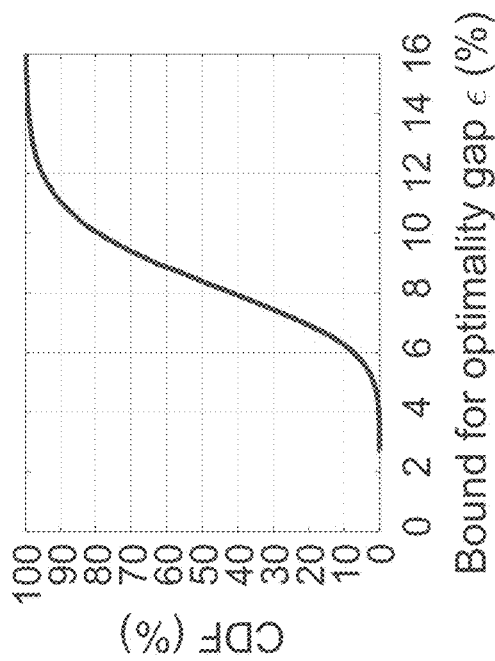
FIG. 5C shows, among the solutions to a set of sub-problems, the cumulative distribution function (CDF) of gaps (in percentage) between sub-problem solutions and optimal objective values for problem OPT-PF under user population size |U|=75.
Figure 5D:
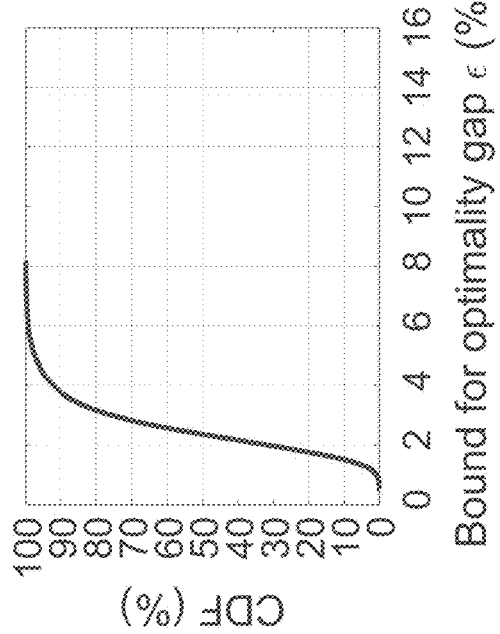
FIG. 5D shows, among the solutions to a set of sub-problems, the cumulative distribution function (CDF) of gaps (in percentage) between sub-problem solutions and optimal objective values for problem OPT-PF under user population size |U|=100.
Figure 8A:
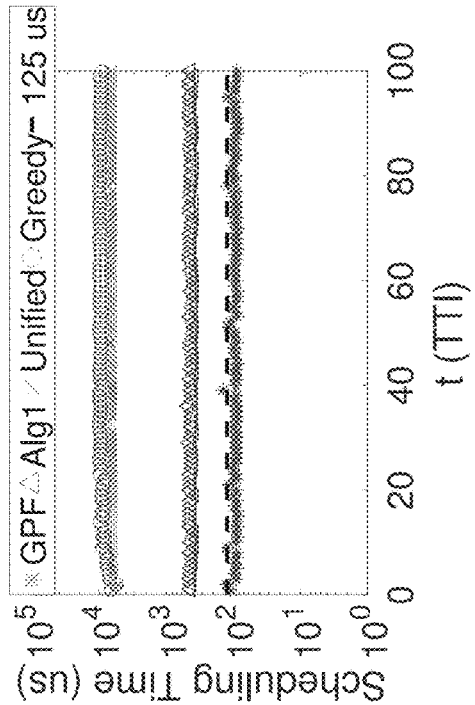
FIG. 8A shows the scheduling time of GPF and existing state-of-the-art PF schedulers for 100 TTIs under user population size |U|=25.
Figure 8B:
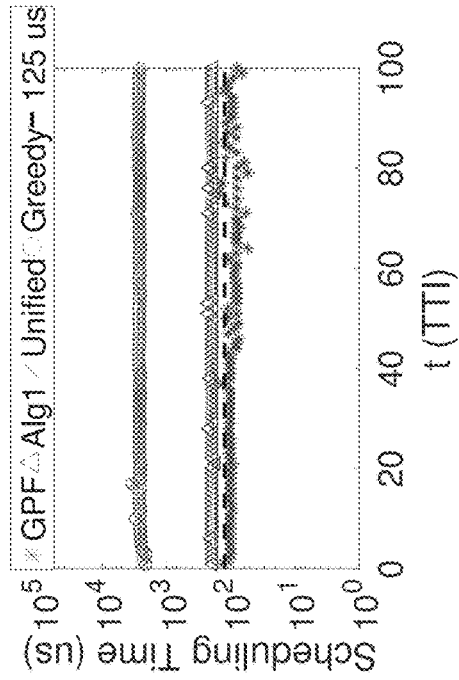
FIG. 8B shows the scheduling time of GPF and existing state-of-the-art PF schedulers for 100 TTIs under user population size |U|=50.
Figure 8C:
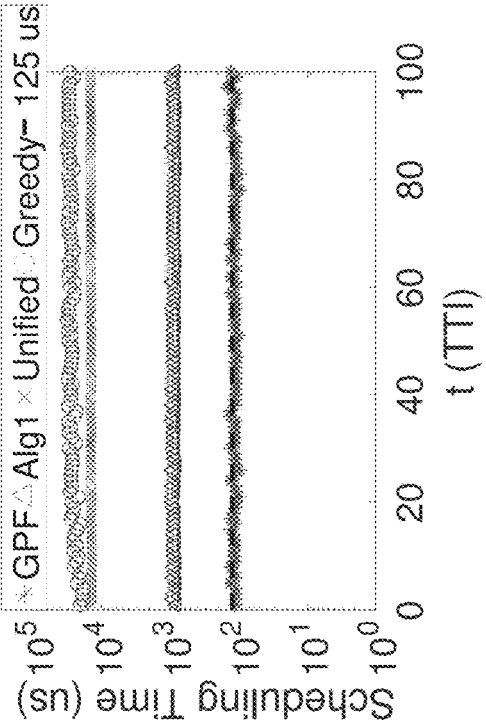
FIG. 8C shows the scheduling time of GPF and existing state-of-the-art PF schedulers for 100 TTIs under user population size |U|=75.
Figure 8D:
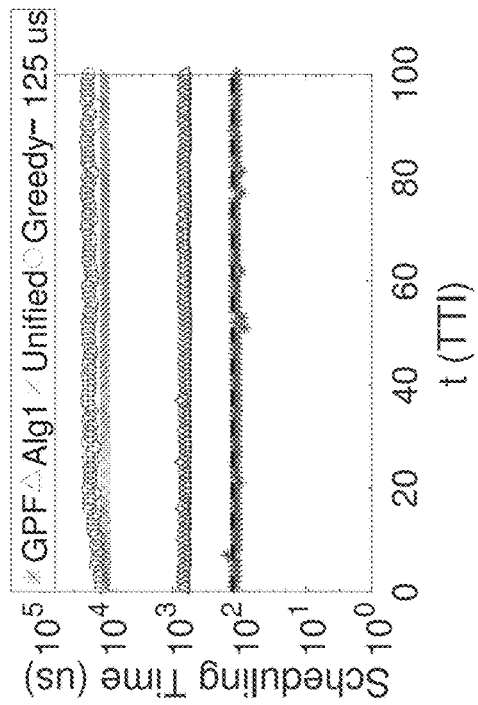
FIG. 8D shows the scheduling time of GPF and existing state-of-the-art PF schedulers for 100 TTIs under user population size |U|=100.
Figure 9A:
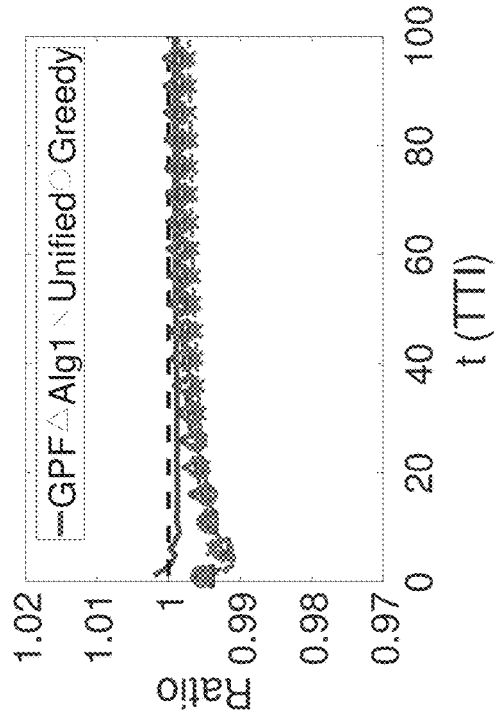
FIG. 9A shows PF objective values achieved by GPF and existing state-of-the-art PF schedulers for 100 TTIs under user population size |U|=25, where the objectives by existing state-of-the-art PF schedulers are obtained offline in non-real time.
Figure 9B:
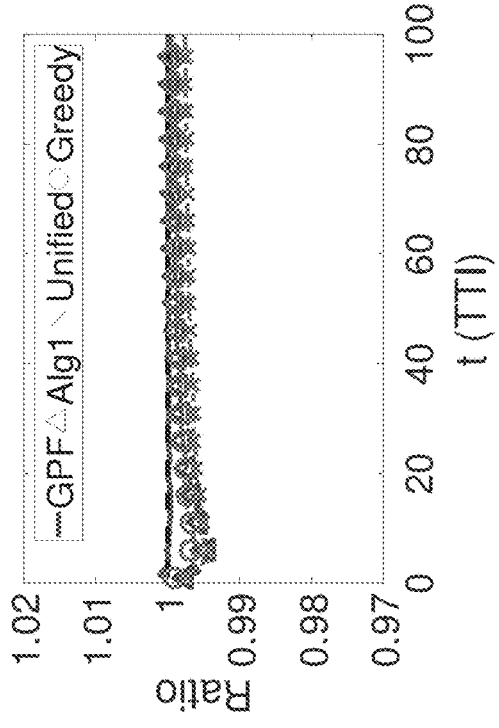
FIG. 9B shows PF objective values achieved by GPF and existing state-of-the-art PF schedulers for 100 TTIs under user population size |U|=50, where the objectives by existing state-of-the-art PF schedulers are obtained offline in non-real time.
Figure 9C:
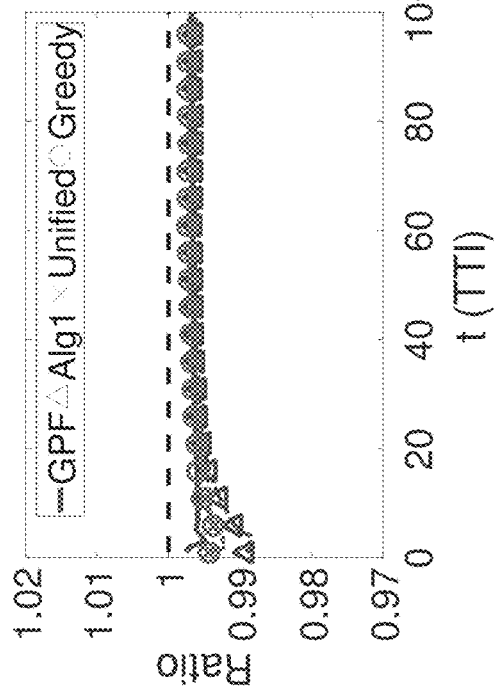
FIG. 9C shows PF objective values achieved by GPF and existing state-of-the-art PF schedulers for 100 TTIs under user population size |U|=75, where the objectives by existing state-of-the-art PF schedulers are obtained offline in non-real time.
Figure 9D:
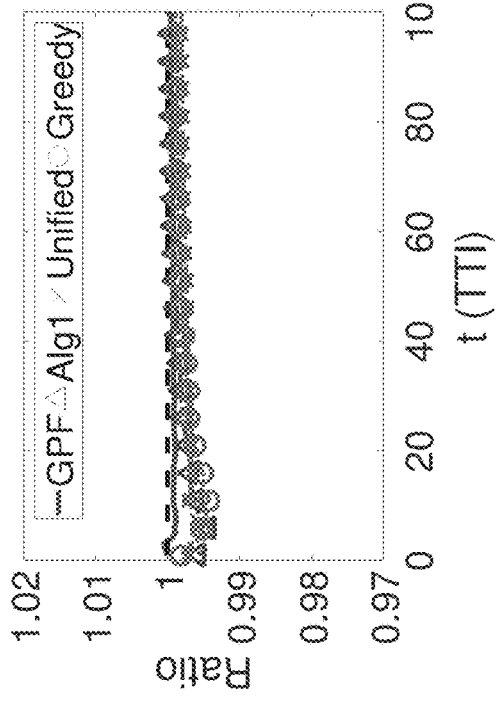
FIG. 9D shows PF objective values achieved by GPF and existing state-of-the-art PF schedulers for 100 TTIs under user population size |U|=100, where the objectives by existing state-of-the-art PF schedulers are obtained offline in non-real time.
Figure 10A:
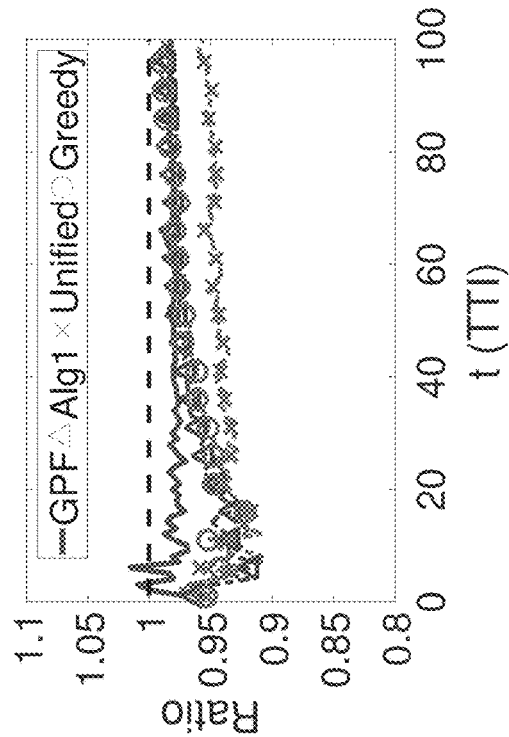
FIG. 10A shows the sum average cell throughput performance achieved by GPF and existing state-of-the-art PF schedulers for 100 TTIs under user population size |U|=25, where the objectives by existing state-of-the-art PF schedulers are obtained offline in non-real time.
Figure 10B:
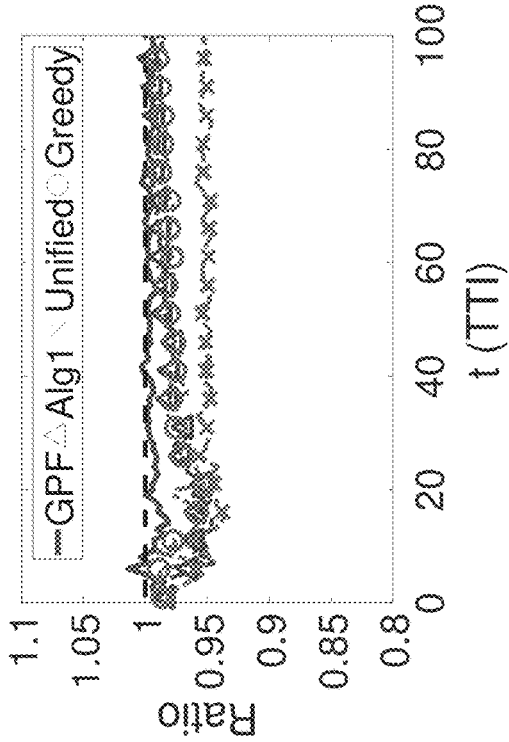
FIG. 10B shows the sum average cell throughput performance achieved by GPF and existing state-of-the-art PF schedulers for 100 TTIs under user population size |U|=50, where the objectives by existing state-of-the-art PF schedulers are obtained offline in non-real time.
Figure 10C:
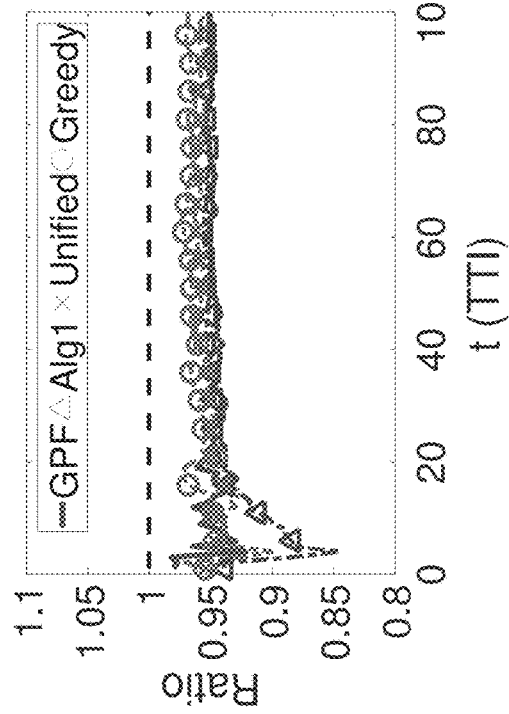
FIG. 10C shows the sum average cell throughput performance achieved by GPF and existing state-of-the-art PF schedulers for 100 TTIs under user population size |U|=75, where the objectives by existing state-of-the-art PF schedulers are obtained offline in non-real time.
Figure 10D:
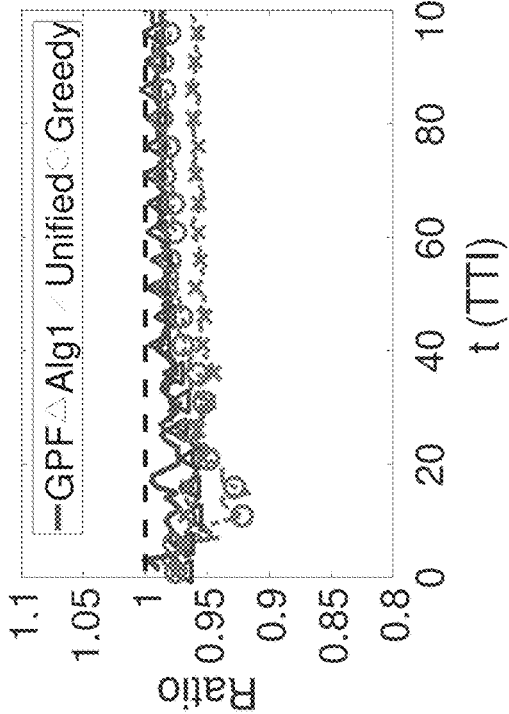
FIG. 10D shows the sum average cell throughput performance achieved by GPF and existing state-of-the-art PF schedulers for 100 TTIs under user population size |U|=100, where the objectives by existing state-of-the-art PF schedulers are obtained offline in non-real time.
Figure 11A:
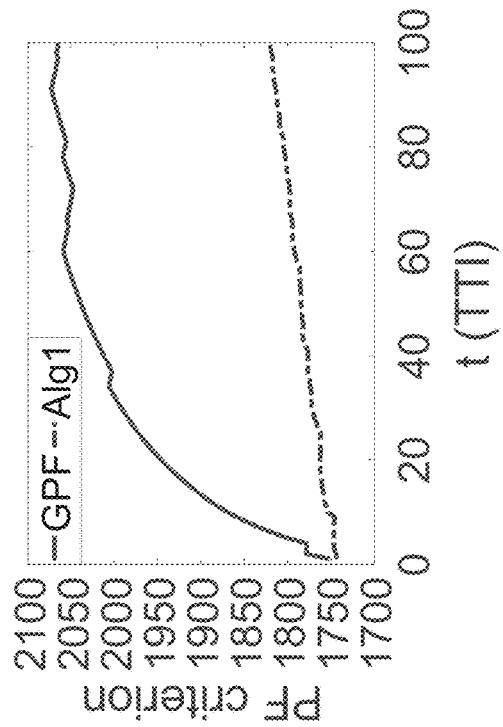
FIG. 11A shows PF objective values achieved by GPF and state-of-the-art LTE PF scheduler for 100 TTIs under user population size |U|=25, where the state-of-the-art LTE PF scheduler updates its scheduling solution in every 1 ms based on LTE standard.
Figure 11B:
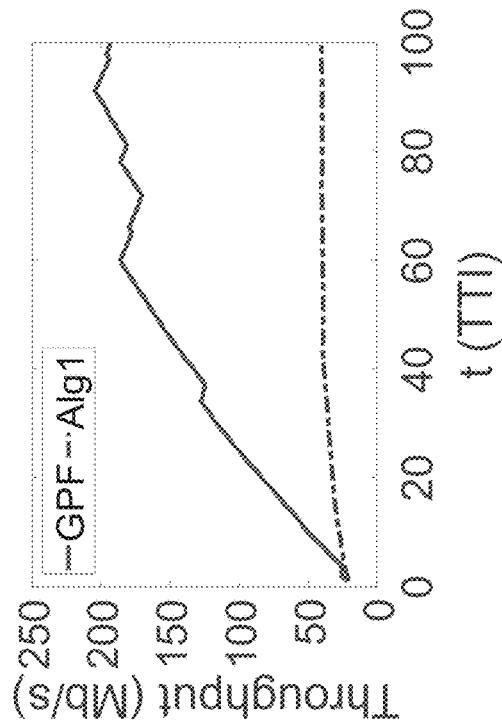
FIG. 11B shows PF objective values achieved by GPF and state-of-the-art LTE PF scheduler for 100 TTIs under user population size |U|=100, where the state-of-the-art LTE PF scheduler updates its scheduling solution in every 1 ms based on LTE standard.
Figure 11C:
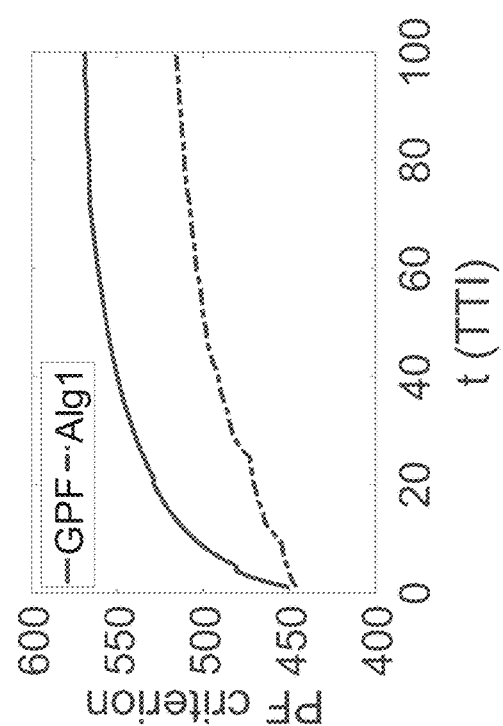
FIG. 11C shows the sum average throughput performance achieved by GPF and state-of-the-art LTE PF scheduler for 100 TTIs under user population size |U|=25, where the state-of-the-art LTE PF scheduler updates its scheduling solution in every 1 ms based on LTE standard.
Figure 11D:
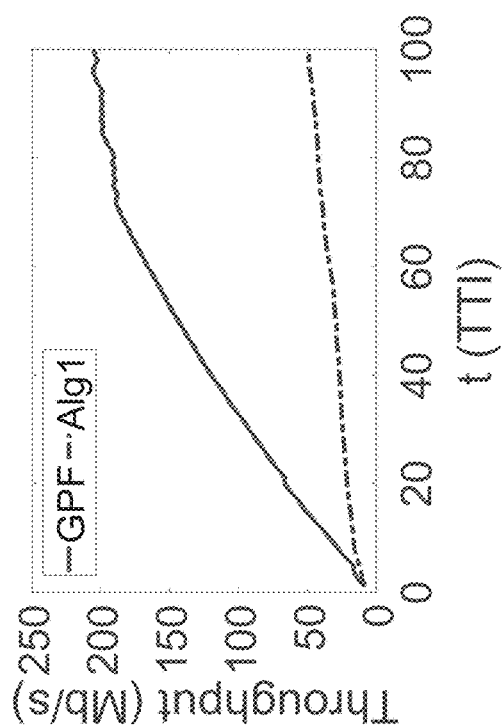
FIG. 11D shows the sum average throughput performance achieved by GPF and state-of-the-art LTE PF scheduler for 100 TTIs under user population size |U|=100, where the state-of-the-art LTE PF scheduler updates its scheduling solution in every 1 ms based on LTE standard.

For user u∈U and RB b∈B, the achievable data-rate for this RB can be determined by FIG. 3. In this figure, M is the maximum level of MCSs allowed in the standard. It represents the most efficient MCS under the best channel condition and thus corresponds to the maximum data-rate. For example, for MCSs in 5G NR, M can be 29 and the corresponding data-rate per RB is 5.5547 $W_0$ [7]. Under the best channel condition, any m≤M can be supported on this RB for transmission. When the channel condition is not perfect, things become more complicated. Denote $q_u^b(t)$ as the maximum level of MCS that can be supported by user u's channel on RB b in TTi t. $q_u^b(t)$ is determined by the channel quality indication (CQI) that is in the feedback report by user u at TTI t−1. Since M is the maximum value for $q_u^b(t)$, we have $q_u^b(t) \leq M$. For a given $q_u^b(t)$, any MCS level from $\{1, 2, \ldots, q_u^b(t)\}$ can be supported on RB b in TTI t. On the other hand, if (t) $q_u^b(t) < M$ and the BS chooses a MCS level m>$q_u^b(t)$ for user u (i.e., beyond the maximum MCS level on RB b), then the achievable data-rate on RB b drops to zero, due to severe bit error [19, 22]. Denote $r_u^{b,m}(t)$ as user u's instantaneous achievable data-rate on RB b with MCS m in TTI t. Then we have:

$$r_u^{b,m}(t) = \begin{cases} r^m, & \text{If } m \leq q_u^b(t), \\ 0, & \text{If } m > q_u^b(t). \end{cases} \quad (5)$$

Recall that for user u∈U, the BS must use the same MCS mode m∈M across all RBs allocated to this user. As an example, suppose there are k RBs (denoted as $b_1, b_2, \ldots, b_k$) allocated to user u. Without loss of generality, suppose $q_u^{b_1}(t) < q_u^{b_2}(t) < \ldots < q_u^{b_k}(t) \leq M$. Then there is a trade-off between the chosen MCS m and the subset of RBs that contribute achievable data-rates. That is, if $m_1 \leq q_u^{b_1}(t)$, then all RBs will contribute some data-rates $r_u^{b,m_1}(t)$; if $q_u^{b_1}(t) < \ldots < q_u^{b_i}(t) = m_2 < q_u^{b_{i+1}}(t) < \ldots < q_u^{b_k}(t)$, then only RBs $b_i, b_{i+1}, \ldots, b_k$ will contribute some data-rates $r_u^{b,m_2}(t)$. Let $R_u(t)$ denote the aggregate achievable data-rate of user u in TTI t. Under a given scheduling decision (consisting of RB allocation as specified in (1) and MCS assignment in (3)), $R_u(t)$ can be computed as follows:

$$R_u(t) = \sum_{b \in \mathcal{B}} x_u^b(t) \sum_{m \in M} y_u^m(t) r_u^{b,m}(t) \quad (6)$$

PF Objective Function

To describe an embodiment of the PF objective function, let $\tilde{R}_u$ denote the long-term average data-rate of user u (averaged over a sufficiently long time period). A widely used objective function for PF is $\Sigma_{u \in U} \log \tilde{R}_u$ [17, 20]. It represents a trade-off between total throughput and fairness among the users. To maximize the PF objective function when scheduling for each TTI t, a common approach is to maximize the metric $$\sum_{u \in \mathcal{U}} \frac{R_u(t)}{\tilde{R}_u(t-1)} \quad (7)$$

during TTI(t−1) and use the outcome of the decision variables for scheduling TTI t [17, 18, 20, 21], where $R_u(t)$ is the scheduled rate to user u for TTI t (which can be calculated in (6)) and $\tilde{R}_u(t-1)$ is user u's exponentially smoothed average data-rate up to TTI(t−1) over a window size of $N_c$ TTIs, and is updated as:

$$\tilde{R}_u(t-1) = \frac{N_c - 1}{N_c} \tilde{R}_u(t-2) + \frac{1}{N_c} R_u(t-1) \quad (8)$$

It has been shown that such real-time (per TTI) scheduling algorithm can approach optimal PF objective value asymptotically when $N_c \to \infty$ [17]. Adopting this understanding, a novel PF scheduler is described herein. Putting equation (27) into equation (28) results in:

$$\sum_{u \in \mathcal{U}} \frac{R_u(l)}{\tilde{R}_u(t-1)} = \sum_{u \in \mathcal{U}} \sum_{b \in \mathcal{B}} \sum_{m \in \mathcal{M}} \frac{r_u^{k,m}(t)}{\tilde{R}_u(t-1)} x_u^b(t) y_u^m(t) \quad (9)$$

Problem Formulation

Based on the above, the PF scheduling optimization problem for TTI t can be formulated as:

OPT-PF $$\text{maximize} \sum_{u \in \mathcal{U}} \sum_{b \in \mathcal{B}} \sum_{m \in \mathcal{M}} \frac{r_u^{b,m}(t)}{\tilde{R}_u(t-1)} x_u^b(t) y_u^m(t)$$

subject to

RB allocation constraints: (2),

MCS assignment constraints: (4), $x_u^b(t) \in \{0, 1\}, \quad (u \in \mathcal{U}, b \in \mathcal{B}.)$ $y_u^m(t) \in \{0, 1\}, \quad (u \in \mathcal{U}, m \in \mathcal{M}.)$ In OPT-PF, $r_u^{b,m}(t)$ is a constant for a given $u \in U$, $b \in B$, $m \in M$ and $q_u^b(t)$. Recall that $q_u^b(t)$ is a constant and is determined by the CQI in user u's feedback report at TTI(t−1), which we assume is available by the design of an NR cellular network. $\tilde{R}_u(t-1)$ is also a constant as it is calculated in TTI(t−1) based on $\tilde{R}_u(t-2)$ available at TTI(t−1) and $R_u(t-1)$ (the outcome of the scheduling decision at TTI(t−2). The only variables here are $x_u^b(t)$ and $y_u^m(t)$ ($u \in U$, $b \in B$, $m \in M$), which are binary integer variables. Since we have a product term $x_u^b(t) \cdot y_u^m(t)$ (nonlinear) in the objective function, we can employ the Reformulation-Linearization Technique (RLT) [29] to linearize the problem. To do this, define $z_u^{b,m}(t) = x_u^b(t) \cdot y_u^m(t)$ ($u \in U$, $b \in B$, $m \in M$). Since both $x_u^b(t)$ and $y_u^m(t)$ are binary variables, $z_u^{b,m_i}(t)$ is also a binary variable and must satisfy the following RLT constraints:

$$z_u^{b,m}(t) \le x_u^b(t), (u \in \mathcal{U}, b \in \mathcal{B}, m \in \mathcal{M}), \quad (10)$$

and $$z_u^{b,m}(t) \le y_u^m(t), (u \in \mathcal{U}, b \in \mathcal{B}, m \in \mathcal{M}). \quad (11)$$

By replacing $x_u^b(t) y_u^m(t)$ with $z_u^{b,m_i}(t)$ and adding RLT constraints, we have the following reformulation for OPT-PF, which we denote as OPT-R:

OPT-R $$\text{maximize} \sum_{u \in \mathcal{U}} \sum_{b \in \mathcal{B}} \sum_{m \in \mathcal{M}} \frac{r_u^{b,m}(t)}{\tilde{R}_u(t-1)} z_u^{b,m}(t)$$

subject to

RB allocation constraints: (2),

MCS assignment constraints: (4),

RLT constraints: (10), (11), $x_u^b(t) \in \{0, 1\}, \quad (u \in \mathcal{U}, b \in \mathcal{B})$ $y_u^m(t) \in \{0, 1\}, \quad (u \in \mathcal{U}, m \in \mathcal{M})$ $z_u^{b,m}(t) \in \{0, 1\}, \quad (u \in \mathcal{U}, b \in \mathcal{B}, m \in \mathcal{M})$ OPT-R is an ILP since all variables are binary and all constraints are linear. Commercial optimizers such as the IBM CPLEX can be employed to obtain optimal solution to OPT-R (optimal to OPT-PF as well), which will be used as a performance benchmark for the scheduler design. Note that ILP is NP-hard in general and is consistent to the fact that our PF scheduling problem is NP-hard [20-22].

The Real-Time Challenge for NR PF Scheduler

Although it is possible to design an algorithm to find a near-optimal solution to OPT-R, it remains an open problem to find a near-optimal solution in real-time. By real-time, we mean that one needs to find a scheduling solution for TTI t during TTI(t−1). For 5G NR, we are talking about on the order of ~100 μs for a TTI, which is much smaller than a scheduling time interval under 4G LTE. This requirement comes from the fact that the shortest slot duration allowed for data transmission in NR is 125 μs under numerology 3. When numerology 3 is used in scenarios with very short channel coherence time, the real-time requirement for scheduler is on a TTI level, i.e., ~100 μs. To the best of our knowledge, we have not seen any scheduling solution in the literature that can claim to solve the PF scheduling problem with a time on the order of ~100 μs. As such, this is the first scheduler design that breaks this technical barrier for real-time scheduling in 5G NR network.

To design a ~100 μs PF scheduler for 5G NR, it is important to first understand why existing LTE schedulers fail to meet such timing requirement. PF schedulers designed for LTE can be classified into two categories: 1) metric-based schemes (typically implemented in industrial-grade schedulers) that only address RB allocation [15, 16], and 2) polynomial-time approximation algorithms that address both RB allocation and MCS assignment [20-22].

Basically, simple metric-based schedulers such as those surveyed in [15, 16] allocate RBs to users in each TTI by comparing per-user metrics (e.g., the ratio between instantaneous rate and past average rate) on each RB. These schedulers do not address the assignment of MCS. In a BS, an independent adaptive modulation and coding (AMC) module is in charge of assigning MCS for each user [14]. Therefore, metric-based schedulers cannot be used to solve our considered problem OPT-PF. On the other hand, from the perspective of optimization, such a decoupled approach cannot achieve near-optimal performance and will have a loss of spectral efficiency.

In the literature, there have been a number of polynomial-time heuristics designed for LTE PF scheduling. These heuristics are sequential and iterative algorithms that need to go through a large number of iterations. For example, Alg1 and Alg2 proposed in [20] first determine the RB allocation without considering constraints of a single MCS per user, and then fix conflicts of multiple MCSs per user by selecting the best MCS for each user given the RB allocation. The computational complexity of Alg1 and Alg2 is O(|U|||B||M|). The Unified Scheduling algorithm proposed in [21] selects a user with its associated MCS and adjusts RB allocation iteratively, until a maximum number of K users are scheduled in a TTI. It has a complexity of O(K U||B||M|). The greedy algorithm proposed in [22] employs a similar iterative design and can support scheduling over multiple carriers. It does not restrict the number of scheduled users per TTI and thus has a complexity of O(|U|²|B||M|) for scheduling on a single carrier.

Among the aforementioned schedulers, Alg1 and Alg2 are the fastest ones since they have the lowest complexity. Consider a practical NR macro-cell setting with 100 users per cell, 100 available RBs, and 29 orders of MCS. The number of iterations that Alg1 and Alg2 need to go through is roughly $2.9 \times 10^5$. Each iteration involves a number of addition, multiplication and comparison operations. Our implementation of Alg1 on a computer with an Intel Xeon E5-2687W v4 CPU (3.0 GHz) shows that the computation time of Alg1 under the considered network setting is beyond 800 µs. More numerical results of these LTE PF schedulers are provided in "Performance Validation" section.

For these sequential PF schedulers, employing more CPU cores cannot help reduce time overhead very much. Although an optimized program can benefit from additional cores (utilizing instruction-level parallelism, e.g., pipelining), the reduction of computational time is far from 10×, which is needed for meeting the timing requirement in 5G NR.

A Design of a Real-Time Scheduler

The basic idea in this design is to decompose the original problem (OPT-R) into a large number of mutually independent sub-problems, with a solution to each sub-problem being a feasible solution to the original problem. Then, the optimal solution can be determined by comparing the objectives of all the feasible solutions. In order to implement this idea, the following two questions must be addressed: (1) How to decompose the original problem into a large number of sub-problems that can be executed in parallel; and (2) how to fit the large number of sub-problems into a given GPU platform.

The first question is directly tied to the time complexity of our scheduler. To meet a time requirement of ~100 µs, each sub-problem must be solved in 10 s of µs. Therefore, it is important that each sub-problem is small in size and requires only very few (sequential) iterations to find a solution. Also, it is desirable that all sub-problems have the same structure and require the same number of iterations to find their solutions.

The second question is to address the space limitation of a given GPU platform. If a GPU had an infinite number of processors, then we can fit each sub-problem into one or a group of processors and there is no issue. Unfortunately, any GPU has a limited number of processors. Although such number is large (e.g., 3840 CUDA cores in a Nvidia Quadro P6000 GPU), it is still much smaller than the number of sub-problems that we have. So we have to remove some sub-problems (that are less likely to produce optimal solutions) so that the remaining sub-problems can fit into the number of GPU processing cores. Addressing these two questions leads to the implementation of an embodiment of the invention on a GPU platform.

In our design of GPF, we do not exploit channel correlations in either time or frequency domains. This is to ensure that GPF works under any operating conditions.

Decomposition

There are a number of decomposition techniques for optimization problems, with each designed for a specific purpose. For example, in branch-and-bound method, a tree-based decomposition is used to break a problem into two sub-problems so as to intensify the search in a smaller search space. In dynamic programming method, decomposition results in sub-problems that still require to be solved recursively. These decompositions cannot be readily parallelized and implemented on GPU.

Our proposed decomposition aims to produce a large number of independent sub-problems with the same structure. Further, each sub-problem is small and simple enough so that GPU cores can complete their computation under a few tens of µs. In other words, our decomposition is tailored toward GPU structure (massive number of cores, lower clock frequency per core, few number of computations for each sub-problem). Such a decomposition can be done by fixing a subset of decision variables via enumerating all possibilities. Then for each sub-problem, we only need to determine the optimal solution for the remaining subset of variables.

To see how this can be done for our optimization problem, consider OPT-PF, i.e., the original problem that has two sets of variables $x_u^b$ and $y_u^m$, $u \in U$, $b \in B$, $m \in M$. To simplify notation, we omit the TTI index t. Recall that variables $x_u^b$'s are for RB allocation (i.e., assigning each RB to a user) while $y_u^m$'s are to determine MCS for a user (i.e., choosing one MCS from M for each user). So we can decompose either along x or y. If we decompose along the x-variable, then we will have $|U|^{|B|}$ sub-problems (since there are |U| ways to assign each RB and we have a total of |B| RBs). On the other hand, if we decompose along y, then we will have $|M|^{|U|}$ sub-problems (since there are |M| ways to assign MCS for a user and we have a total of |U| users). Here, we choose to decompose along y, partly due to the fact that the "intensification" technique that we propose to use can work naturally for such sub-problem structure.

For a given y-variable assignment, denote $y_u^m = Y_u^m$, where $Y_u^m$ is a constant (0 or 1) and satisfies the MCS constraint (4), i.e., $\Sigma_{m \in M} Y_u^m = 1$. Then OPT-PF degenerates into the following sub-problem (under this given y-variable assignment):

OPT(Y)

$$\text{maximize} \sum_{u \in U} \sum_{b \in B} \sum_{m \in M} \frac{r_u^{b,m}}{\tilde{R}_u} Y_u^m \cdot x_u^b$$

subject to

RB allocation constraints (2), $x_u^b \in \{0, 1\}, \quad (u \in U, b \in B)$

In the objective function, for $$\sum_{m \in M} \frac{r_u^{b,m}}{\tilde{R}_u} Y_u^m,$$

only one term in the summation is non-zero, due to the MCS constraint on $Y_u^m$. Denote the m for this non-zero $Y_u^m$ as $m_u^*$. Then the objective function becomes $$\sum_{u \in \mathcal{U}} \sum_{b \in \mathcal{B}} \frac{r_u^{b,m_u^*}}{\tilde{R}_u} \cdot x_u^b.$$

By interchanging the two summation orders, we have:

$$\sum_{u \in \mathcal{U}} \sum_{b \in \mathcal{B}} \frac{r_u^{b,m_u^*}}{\tilde{R}_u} \cdot x_u^b = \sum_{b \in \mathcal{B}} \sum_{u \in \mathcal{U}} \frac{r_u^{b,m_u^*}}{\tilde{R}_u} \cdot x_u^b.$$

OPT(Y) now becomes:

$$\text{maximize} \sum_{b \in \mathcal{B}} \sum_{u \in \mathcal{U}} \frac{r_u^{b,m_u^*}}{\tilde{R}_u} x_u^b$$

subject to

RB allocation constraints: (2), $x_u^b \in \{0, 1\}, \quad (u \in \mathcal{U}, b \in \mathcal{B})$ For a given b∈B, there is only one term in the inner summation $$\sum_{u \in \mathcal{U}} \frac{r_u^{b,m_u^*}}{\tilde{R}_u} x_u^b$$

that can be non-zero, due to the RB allocation constraint (2). So $$\sum_{u \in \mathcal{U}} \frac{r_u^{b,m_u^*}}{\tilde{R}_u} x_u^b$$

is maximized when the $x_u^b$ corresponding to the largest $$\frac{r_u^{b,m_u^*}}{\tilde{R}_u}$$

across all users is set to 1 while others are set to 0. Physically, this means that the optimal RB allocation (under a given MCS setting) is achieved when each RB is allocated to a user that achieves the largest instantaneous data-rate normalized by its average rate.

We have just shown how to solve each sub-problem involving x-variable (RB allocation) under a given y-variable (MCS) assignment. If we solve it sequentially, the computational complexity of each sub-problem is |B||U|. Note the solution to the sub-problem also allows us to perform optimal RB allocation in parallel for all RBs. In this case, the computational complexity of the sub-problem can be reduced to |U| iterations that are used to search for the most suitable user for each RB.

Selection of Sub-Problems

After problem decomposition by enumerating all possible settings of the y-variable, we have a total of $|M|^{|\mathcal{U}|}$ sub-problems. This is too large to fit into a GPU and solve them in parallel. In this second step, we will identify a set of K sub-problems that are most promising in containing optimal (or near-optimal) solutions and only search the best solution among these K sub-problems. Our selection of the set of K sub-problems is based on the intensification and diversification techniques from optimization (see, e.g., [30]). The basic idea is to break up the search space into promising and less promising subspaces and devote search efforts mostly to the most promising subspace (intensification). Even though there is a small probability that the optimal solution may still lie in the less promising subspace, we can still be assured that we can get a high quality near-optimal solution in the most promising subspace. So the first question to address is: what is the most promising search subspace (among all possible y-variable settings) for the optimal solution?

Recall that each user has |M| levels of MCS to choose from, with a higher level of MCS offering a higher achievable data rate but also requiring a better channel condition. Recall for each b∈B, $q_u^b$ is the maximum level of MCS that can be supported by user u's channel. Since $q_u^b$ differs for different b∈B, denote $q_u^{max} = \max_{b \in \mathcal{B}} q_u^b$ as the highest level of MCS that user u's channel can support among all RBs. Then for user u, it is safe to remove all MCS assignments with $m > q_u^{max}$ (since such MCS assignments will have a rate of 0 on RB b∈B) and we will not lose the optimal solution.

Among the remaining MCS settings for user u, i.e., $\{1, 2, \ldots, q_u^{max}\}$, it appears that the search space for user u with MCS settings close to $q_u^{max}$ is most promising. To validate this idea, we conduct a numerical experiment using CPLEX solver to solve OPT-R (not in real time) and examine the probability of success in finding the optimal solution as a function of the number of MCS levels near $q_u^{max}$ (inclusive) for each user u∈U. Specifically, denote:

$$Q_u^d = \{m | \max(1, q_u^{max} - d + 1) \le m \le q_u^{max}\} \subset M \quad (12)$$

as the set of d MCS levels near $q_u^{max}$ (inclusive), where d ∈ N* denotes the number of descending MCS levels from $q_u^{max}$. For example, when d=1, we have $Q_u^1 = (m | m = q_u^{max})$ for user u, meaning that user u will only choose its highest allowed MCS level $q_u^{max}$; when d=2, we have $Q_u^2 = (m | q_u^{max} - 1 \le m \le q_u^{max})$ for user u, meaning that user u's MCS can choose between $q_u^{max} - 1$ and $q_u^{max}$. Across all |U| users, we define:

$$Q^d = Q_1^d \times \ldots \times Q_{|u|}^d \subset M^{|u|} \quad (13)$$

as the Cartesian of sets $Q_1^d, Q_2^d, \ldots, Q_{|u|}^d$. Clearly, $Q^d$ contains MCS assignment vectors for all users where the MCS assigned to each user u is within its corresponding set $Q_u^d$.

In our experiment, we consider a BS with 100 RBs and the number of users ranging from 25, 50, 75, and 100. A set of 29 MCSs (see FIG. 3) can be used for each user. For a given number of users, we run experiments for 100 TTIs (t=1, 2, ..., 100) with Nc=100. Here we consider scenarios without frequency correlation, where channel conditions ($q_u^b$'s) vary independently across RBs for each user. Detailed experimental settings are discussed with respect to "Performance Validation" section below. FIGS. 4A through 4D show the percentage of optimal solutions in $Q^d$ as a function of d under different user population sizes (25, 50, 75 or 100). For example, when |U|=25, 93% optimal solutions are within $Q^6$; when |U|=75, 96% optimal solutions are within $Q^3$.

Now we turn the table around and are interested in the probability of success in finding the optimal solution for a given d. Then FIGS. 4A-4D suggest that for a given success probability (say 90%), the value of d required to achieve this success probability decreases with the user population size (d=6 for |U|=25, d=3 for |U|=50, d=3 for |U|=75, and d=2 for |U|=100). This is intuitive, as for the same number of RBs, the greater the number of users, the fewer the number of RBs to be allocated to each user, leading to the need of fewer levels of MCS for selection. More importantly, FIGS. 4A-4D show that for a target success probability (90%), we only need to set d to a small number and a corresponding small search space $Q^d$ would be sufficient to achieve this success probability.

For a given target success probability, the optimal d depends not only on |U| but also on users' channel conditions. For instance, when there are frequency correlations among RBs, i.e, the coherence bandwidth is greater than an RB, the optimal d may change. Thus in a practical NR cell, optimal d under each possible |U| should be adapted online to keep up with the changes of channel conditions. Specifically, the BS frequently computes optimal solution to OPT-PF under the current |U| based on users' CQI reports, and records the smallest d that contains the optimal solution associated with the given |U|. Such computations can be done only for selected TTIs and there is no strict real-time requirement. Optimal values of d under different |U|'s are re-calculated periodically based on recorded results through the statistical approach described above, and are maintained in a lookup table stored in the BS's memory. During run-time, the BS sets d adaptively based on the number of active users in the cell by simply looking up the table.

For any subspace $Q^d$ with d>1, the huge number of sub-problems in it (e.g., for $Q^2$ with 100 users, we have $2^{100}$ sub-problems) prohibits us from enumerating all possibilities using a real-world GPU. We need to select K sub-problems from the promising subspace through intensification. Our strategy is to use random sampling based on certain distribution. The selection of probability distribution for sampling is open to special design. In this work, we employ uniform distribution as an example. Specifically, after determining the promising sub-space $Q^d$, for each of the K sub-problems that we consider, we choose MCS for each user u from $Q_u^d$ randomly following a uniform distribution. This is equivalent to sampling from $Q^d$ with a uniform distribution. Note that this sampling can be executed in parallel on a GPU across all K sub-problems and users (see "Implementation" section below). This finalizes our selection of sub-problems.

Near-Optimality of Sub-Problem Solutions

Through the above search intensification, we may not always be able to obtain the optimal solution to OPT-PF by solving the K sampled sub-problems. However, as we will show next, the K sub-problem solutions (samples) would almost surely contain at least one near-optimal solution to OPT-PF (e.g., within 95% of optimum).

The science behind this is as follows. Denote the gap (in percentage) of a sample from the optimum by a. For a given bound for optimality gap $\varepsilon \in [0\%, 100\%]$, denote $p_{1-\varepsilon}$ as the probability that a sample is $(1-\varepsilon)$-optimal, i.e., the sample achieves at least $(1-\varepsilon)$ of the optimal objective value. We have $p_{1-\varepsilon}=P(a\leq\varepsilon)$. The probability $p_{1-\varepsilon}$ is the same among all K samples since they are sampled from the same search subspace following a common uniform distribution. Denote $P_{K, 1-\varepsilon}$ as the probability that at least one sample (among the K samples) is $(1-\varepsilon)$-optimal. Since all samples are mutually independent, we have:

$$P_{K,1-\varepsilon}=1-(1-p_{1-\varepsilon})^K$$

Therefore, to ensure that $P_{K,1-\varepsilon}\geq 99.99\%$, i.e., to have more than 99.99% probability of achieving $(1-\varepsilon)$-optimal by the K samples, we should have $$p_{1-\varepsilon} \geq 1 - \sqrt[K]{1-99.99\%}$$

which depends on the value of K, i.e., the number of sub-problems that can be handled by the available GPU cores. The Nvidia Quadro P6000 GPU we employed in the implementation can solve K=300 sub-problems under a realistic setting of 100 RBs and 25~100 users. Therefore, we should have $p_{1-\varepsilon}\geq 3.02\%$ to ensure, $P_{K,1-\varepsilon}\geq 99.99\%$.

We now investigate the probability $p_{1-\varepsilon}$ through experiments. The environment setting is: |B|=100, |U|∈ {25, 50, 75, 100}, and |M|=29. We consider the scenario without frequency correlation. The parameter d is set to 6, 3, 3, and 2 for |U|=25, 50, 75, and 100, respectively. We run experiments for 100 TTIs with $N_c$=100. For each TTI, we generate 100 samples from $Q^d$ under each |U|, and record gaps (a's) of their objective values from the optimum. Thus for each |U|, we have 10000 samples and their corresponding a's. Cumulative distribution functions (CDFs) of a under different |U|'s are shown in FIGS. 5A-5D. Coordinates of each point on these CDFs correspond to a given e associated with the (empirical) probability $p_{1-\varepsilon}$. We can see that the ε value satisfying $p_{1-\varepsilon}\geq 3.02\%$ starts from 5.35%, 1.34%, 1.24%, 0.47% for |U|=25, 50, 75, and 100, respectively. That is, with 99.99% probability, at least one of the K=300 samples achieves 94.65%-, 98.66%-, 98.76%- and 99.53%-optimal for |U|=25, 50, 75, and 100, respectively. These experimental results verify that our search intensification described in "Selection of Sub-Problems" section can deliver near-optimal performance in solving problem OPT-PF.

When the sampling is parallelized, although there may exist identical samples, it is easy to calculate that such probability is very small as each sample consisting of |U| MCS assignments. In fact, even if there are identical samples, it will not affect much on the near-optimal performance because we have a large number (hundreds) of samples available.

Implementation

Why Choose GPU for Implementation

From the perspective of implementing 5G NR scheduling, there are a number of advantages of GPU over FPGA and ASIC. First, in terms of hardware, GPU is much more flexible. By design, GPU is a general-purpose computing platform optimized for large-scale parallel computation. It can be implemented for different scheduling algorithms without hardware change. In contrast, FPGA is not optimized for massive parallel computation, while ASIC is made for a specific algorithm and cannot be changed or updated after the hardware is made. Second, in terms of software, GPU (e.g., Nvidia) comes with highly programmable tool such as CUDA, which is capable of programming the behavior of each GPU core. On the other hand, it is much more complicated to program the same set of functions in FPGA. Finally, in terms of cost and design cycle, the GPU platform that we use is off-the-shelf, which is readily available and at low cost (for BS). On the other hand, the cost for making an ASIC could be orders of magnitude higher than off-the-shelf GPU. It will take a considerable amount of time to develop an ASIC.

Next, we show how the proposed scheduler is implemented on an off-the-shelf GPU to meet the design target of getting near-optimal scheduling solution in ~100 μs.

Fitting Sub Problems into a GPU

We use an off-the-shelf Nvidia Quadro P6000 GPU [31] and the CUDA programming platform [32]. This GPU consists of 30 streaming multi-processors (SMs). Each SM consists of 128 small processing cores (CUDA cores). These cores are capable of performing concurrent computation tasks involving arithmetic and logic operations. Under CUDA, the K sub-problems considered by the scheduler per TTI is handled by a grid of thread blocks. An illustration of this implementation is given in FIG. 6. Since our Nvidia GPU has 30 SMs, we limit each SM to handle one thread block so as to avoid sequential execution of multiple thread blocks on a SM. Since the processing of each sub-problem requires $\max\{|B|, |U|\}$ threads (see Steps 1 and 2 in FIG. 6) and a thread block can have a maximum of 1024 threads, the number of sub-problems that can be solved by each thread block is $$I = \min\left\{ \left\lfloor \frac{1024}{|\mathcal{B}|} \right\rfloor, \left\lfloor \frac{1024}{|\mathcal{U}|} \right\rfloor \right\} \quad (14)$$

Thus, the total number of sub-problems that we can fit into an Nvidia Quadro P6000 GPU for parallel computation is $K=30 \cdot I$. For example, for $|B|=100$ RBs and $|U|=100$ users, the GPU can solve $K=300$ sub-problems in parallel.

Solution Process

To find an optimal (or near-optimal) solution on a GPU, we need to spend time for three tasks: (i) transfer the input data from Host (CPU) memory to GPU's global memory; (ii) generate and solve $K=30 \cdot I$ sub-problems with 30 thread blocks (one thread block per SM); and (iii) transfer the final solution back to the Host (CPU) memory. In the rest of this section, we give details for each task.

Transferring Input Data to GPU

Based on the above discussion, we only transfer input data associated with the promising search space $Q^{d*}$, where $d*$ depends on the user population $|U|$. For each user u, only $d*$ MCS levels in $Q^{d*}$ will be considered in the search space. Note that even if with up to 10% probability we may miss the optimal solution in $Q^{d*}$, we can still find extremely good near-optimal solutions in $Q^{d*}$. The input data that we need to transfer from Host (CPU) memory to the GPU's global memory include $r_u^{b,m}$'s (for $m \in Q_u^{d*}$, $u \in U$, $b \in B$) and $\tilde{R}_u$'s (for $u \in U$). For example, with 100 users and 100 RBs, we have $d*=2$. Then the size of transferred data is equal to 80 KB for $r_u^{b,m}$'s plus 0.4 KB for $\tilde{R}_u$'s (with float data-type).

Generating and Solving K Sub-Problems

Within each SM, K/30 sub-problems are to be generated and solved with one thread block. Then the best solution among the K/30 sub-problems is selected and sent to the global memory. This is followed by a round of selection of the best solution from the 30 SMs (with a new thread block). FIG. 6 shows the five steps that we designed to complete this task. We describe each step as follows. Steps 1 to 4 are completed by each of the 30 thread blocks (SMs) in parallel. Step 5 follows after the completion of Step 4 across all 30 thread blocks and is done with a new thread block.

Step 1 (Generating Sub-Problems) Each of the 30 thread blocks needs to first generate I sub-problems, where I is defined in equation (14). For each sub-problem, an MCS level for each user u is randomly and uniformly chosen from the set $Q_u^{d*}$. Doing this in parallel requires $|U|$ threads for each sub-problem. Thus, to parallelize this step for all I sub-problems, we need to use $I \cdot |U| \le 1024$ threads. Threads should be synchronized after this step to ensure that all sub-problems are successfully generated before the next step.

Step 2 (Solving Sub-Problems) For each of the I sub-problems (i.e., given y-variable), optimal RB allocation ($x_u^b$'s) can be determined by solving OPT(Y). For each sub-problem, the allocation of each RB $b \in B$ to a user is done in parallel with $|B|$ threads. With I sub-problems per block, we need $I \cdot |B| \le 1024$ threads for parallelizing this step. Each thread needs to have input data for all users for comparison. Due to the small size of shared memory in a SM (only 96 KB per SM for Nvidia Quadro P6000 GPU), we cannot store the input data for all $|U|$ users in a SM's shared memory (a part of the shared memory is reserved for other intermediate data). On the other hand, if we let the thread read out data for each user separately from the GPU's global memory, it will result in $|U|$ times of access to the global memory. Recall that access time to the global memory in a GPU is much slower than that to the shared memory in a SM. To address this problem, we put $|U|$ users into several sub-groups such that the input data for each sub-group of users can be read out from the global memory in one access and fit into a SM's shared memory. This will result in a major reduction in the number of times that are required for accessing global memory in this step. Once we have the input data for the sub-group of users in the shared memory, we let the thread find the most suitable user for the given RB within this sub-group. By performing these operations for each sub-group of users, a thread will find the optimal RB allocation for the sub-problem. A synchronization of all threads in a block is necessary after this step.

Step 3 (Calculation of Objective Values): Given the optimal RB allocation for the sub-problem in Step 2, we need to calculate the objective value under the current solution to the sub-problem. The calculation of objective value involves summation of $|B|$ terms. To reduce the number of iterations in completing this summation, we employ a parallel reduction technique. FIG. 7 illustrates this technique. We use $|B|/2$ threads in parallel and only require $\log_2(|B|)$ iterations to complete the summation of $|B|$ terms. A key in the parallel reduction in shared memory is to make sure that threads are reading memory based on consecutive addressing. For I sub-problems, we need $I \cdot |B|/2 \le 1024$ threads for this step. Again, threads must be synchronized after this step is completed.

Step 4 (Finding the Best Solution in a Thread Block): At the end of Step 3, we have I objective values in a SM corresponding to I sub-problems. In this step, we need to find the best solution (with the highest objective value) among the solutions to the I sub-problems. This is done through comparison, which again can be realized by parallel reduction. We need I/2 threads to parallelize this comparison. After synchronizing the I/2 threads, we write the best solution along with its objective value to the GPU's global memory.

Step 5 (Finding the Best Solution Across All Blocks): After Steps 1 to 4 are completed by the 30 thread blocks (SMs), we have 30 solutions (and their objective values) stored in the global memory, each corresponding to the best solution from its respective thread block. Then we create a new thread block (with 15 threads) to find the "ultimate" best from these 30 "intermediate" best solutions. Again, this step can be done through parallel reduction.

Transferring Output Solution to Host

After we find the best solution in Step 5, we transfer this solution from the GPU back to the Host (CPU)'s memory.

Performance Validation

Experiment Platform

Our experiment was done on a Dell desktop computer with an Intel Xeon E5-2687W v4 CPU (3.0 GHz) and an Nvidia Quadro P6000 GPU. Data communications between CPU and GPU goes through a PCIe 3.0 X16 slot with default configuration. Implementation on the GPU is based on the Nvidia CUDA (version 9.1) platform. For performance comparison, the IBM CPLEX Optimizer (version 12.7.1) is employed to find an optimal solution to OPT-R.

Settings

We consider an NR macro-cell with a BS and a number of users. The user population size $|U|$ is chosen from $\{25, 50, 75, 100\}$. The number of available RBs is $|B|=100$. Assume that a set of $|M|=29$ MCSs shown in FIG. 3 is available to each user. Numerology 3 (refer to Table 1) of NR is considered, where the sub-carrier spacing is 120 kHz, the duration of a TTI is 125 μs, and the bandwidth per RB is 1.44 MHz. The full-buffer traffic model is employed. For wireless channels, we consider the block-fading channel model for both frequency and time, i.e., channel conditions vary independently across RBs and TTIs [33]. Channel variations across TTIs model the fast time-varying fading effect caused by user mobility. To model the large-scale fading effect, the highest feasible MCS level across all RBs is higher for users that are closer to the BS and is lower for cell-edge users. For the frequency-selective fading effect, we first consider the worst-case scenario where parameters $q_u^b(t)$'s across all RBs are uncorrelated and randomly generated for each user. Such setting can effectively test the robustness of GPF under the extreme operating condition. Then we consider cases with frequency correlation where channel conditions ($q_u^b(t)$'s) on a group of consecutive RBs (within the coherence bandwidth) are the same but vary independently across different groups.

Performance

In addition to the optimal solution obtained by CPLEX, we also incorporate the algorithm Alg1 proposed in [20], the Unified algorithm proposed in [21], and the Greedy algorithm proposed in [22] for performance comparison. We set the maximum number of scheduled users per TTI to 20 for the Unified algorithm in all cases.

First, it is necessary to verify that the GPF scheduler can meet the requirement of ~100 μs for scheduling time overhead, which is the major purpose of this invention. We consider the worst-case scenario where there is no frequency correlation, i.e., $q_u^b(t)$'s change independently across RBs. Based on the above results, the parameter d* for controlling the sampling sub-space $Q^{d*}$ is 6, 3, 3 and 2 for $|U|=25$, 50, 75 and 100, respectively. Results of scheduling time for 100 TTIs are shown in FIGS. 8A through 8D. Computation time of CPLEX is not shown in the figures since it is much larger than that of other algorithms. The average computation time of CPLEX is 3.20 s, 10.62 s, 18.17 s, and 30.23 s for $|U|=25$, 50, 75, and 100, respectively. We can see that under all considered user population sizes, the scheduling time of GPF is within 125 μs (the shortest slot duration among numerology 0, 1, 2, and 3) in most cases. Specifically, mean value and standard deviation of scheduling time are 96.16 μs and 16.60 for $|U|=25$, 94.93 μs and 9.36 for $|U|=50$, 112.60 μs and 6.47 for $|U|=75$, and 116.21 μs and 8.22 for $|U|=100$. On the other hand, Alg1, which is the best among the state-of-the-art schedulers used in comparison, has a mean computation time of 189.7 μs for $|U|=25$, 416.6 μs for $|U|=50$, 630.8 μs for $|U|=75$, and 855.7 μs for $|U|=100$.

In FIGS. 8A through 8D, there are a few instances where the scheduling time is beyond 125 μs. To check the reason for these rare overtime instances, we run an experiment solely with GPF to investigate the time overheads contributed by different execution stages, including transferring data from CPU to GPU, processing at GPU, and transferring the solution from GPU back to CPU. Mean values and standard deviations of processing time in different stages with different user population sizes (each for 1000 TTIs) are shown in Table 3. The GPF computation time corresponds to GPU time overhead entry in Table 3.

TABLE 3

Time Consumed in Different Stages (data are in in the format (mean (μs), standard deviation))

| | $|u|=25$ | $|u|=50$ | $|u|=75$ | $|u|=100$ |
|---|---|---|---|---|
| C-to-G | (18.88, 4.62) | (18.23, 5.69) | (26.58, 3.82) | (25.27, 7.10) |
| GPU | (26.40, 2.74) | (26.83, 3.86) | (38.95, 1.46) | (48.00, 1.60) |
| G-to-C | (43.27, 11.36) | (51.06, 14.26) | (50.16, 5.97) | (46.85, 10.14) |
| Total | (88.55, 12.50) | (96.12, 14.73) | (115.70, 7.01) | (120.12, 12.34) |

It can be seen that the time spent for computing a scheduling solution at the GPU is much shorter than 100 μs with very small deviation. It meets our target of designing a PF scheduler that has low complexity and extremely short computational time. On the other hand, the most significant time overhead is introduced by the data transfer between GPU and CPU. Such data transfer operations take more than 60% of the total scheduling time overhead. Thus we conclude that the bottleneck of GPF is on the communication between GPU and CPU. However, a hardware-level tuning to optimize the GPU-CPU communication bus is beyond the scope of this invention. But it does suggest that this data transfer overhead can be reduced by a customized design of CPU-GPU system with optimized bus for real-world NR BSs.

Next we verify the near-optimal performance of GPF. We consider two important performance metrics, including the PF criterion $\Sigma_{u \in U} \log_2(\tilde{R}_u(t))$ (the ultimate objective of a PF scheduler) and the sum average cell throughput $\Sigma_{u \in U} \tilde{R}_u(t))$ (representing the spectral efficiency). The PF and sum throughput performance for 100 TTIs is shown in FIGS. 9A through 9D and FIGS. 10A through 10D, respectively. In these figures, we take the ratio between the metric (PF or throughput) achieved by a scheduler and that achieved by an optimal solution from CPLEX. Note that there are instances where the ratio is larger than one because CPLEX's solution is optimal with respect to the per-TTI objective (7), but not the metrics we consider. Clearly, GPF achieves near-optimal performance and is no worse than all three LTE PF schedulers in all cases. GPF performs particularly well when the user population size is larger than or equal to 50.

We have also run experiments for scenarios with frequency correlation, where $q_u^b(t)$'s are the same within a group of consecutive RBs and change randomly across groups. Results with coherence bandwidth equal to 2 and 5 RBs indicate that optimal d's change with frequency correlations. Specifically, when coherence bandwidth covers 2 RBs, optimal d's for $|U|=25$, 50, 75 and 100 are 5, 3, 3 and 2, respectively; when coherence bandwidth covers 5 RBs, optimal d's are 4, 3, 3 and 2, respectively. With adjusted settings of d, GPF achieves similar real-time and near-optimal performance as in the case without frequency correlation.

On that basis it can be concluded that GPF is able to achieve near-optimal performance and meet NR's requirement of ~100 μs for scheduling time overhead.

Why LTE Scheduler Cannot be Reused for 5G NR

In LTE, the time resolution for scheduling is 1 ms since the duration of a TTI is fixed to 1 ms. It means that an LTE scheduler updates its solution every 1 ms. To investigate the efficiency of reusing an LTE scheduler in 5G NR, we conduct an experiment with the following setting. Assume that the channel coherence time covers two slot durations under numerology 3, i.e., 250 μs (likely to occur at a high frequency band). We compare two scheduling schemes: Scheme 1: Update the scheduling solution every 8 slots (since 1 ms/125 μs=8) by using an LTE scheduler; Scheme 2: In each slot, use GPF to compute the solution. If the time spent is shorter than a slot duration (<125 μs), update solution; otherwise, reuse the previous solution. We adopt Alg1 algorithm for the LTE scheduler since it is able to find a solution in 1 ms and is the fastest among the state-of-the-art PF schedulers. Results of the two schemes for 100 TTIs under |U|=25 and 100 are shown in FIGS. 11A through 11D. We can see that for both the PF criterion and the sum average cell throughput, GPF significantly outperforms Alg1, which demonstrates that existing PF schedulers designed for 4G LTE cannot be used for 5G NR.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention. All references cited are incorporated herein in their entirety.

APPENDIX

References

[1] Ericsson Technology Review, "5G new radio: Designing for the future." Available: https://www.ericsson.com/en/ericsson-technology-review/archive/2017/designing-for-the-future-the-5g-nr-physical-layer
[2] Qualcomm, "Making 5G NR a commercial reality." Available: https://www.qualcomm.com/media/documents/files/making-5g-nr-a-commercial-reality.pdf
[3] Z. E. Ankarali, B. Peköz, and H. Arslan, "Flexible radio access beyond 5G: A future projection on waveform, numerology, and frame design principles," IEEE Access, vol. 5, pp. 18295-18309, May 2017.
[4] 3GPP TR 38.913 version 14.3.0, "Study on scenarios and requirements for next generation access technologies." Available: https://portal.3gpp.org/desktopmodules/Specifications/SpecificationDetails.aspx?specificationId=2996
[5] 3GPP TR 38.804 version 14.0.0, "Study on New Radio access technology; Radio interface protocol aspects." Available: https://portal.3gpp.org/desktopmodules/Specifications/SpecificationDetails.aspx?specificationId=3070
[6] 3GPP TS 38.211 version 15.0.0, "NR; Physical channels and modulation." Available: https://portal.3gpp.org/desktopmodules/Specifications/SpecificationDetails.aspx?specificationId=3213
[7] 3GPP TS 38.214 version 15.0.0, "NR; Physical layer procedures for data." Available: https://portal.3gpp.org/desktopmodules/Specifications/SpecificationDetails.aspx?specificationId=3216
[8] 3GPP TS 38.101-1 version 15.0.0, "NR; User Equipment (UE) radio transmission and reception; Part 1: Range 1 Standalone." Available: https://portal.3gpp.org/desktopmodules/Specifications/SpecificationDetails.aspx?specificationId=3201
[9] 3GPP TS 38.300 version 15.0.0, "NR; NR and NG-RAN overall description." Available: https://portal.3gpp.org/desktopmodules/Specifications/SpecificationDetails.aspx?specificationId=3191
[10] 3GPP TR 22.891 version 14.2.0, "Feasibility study on new services and markets technology enablers; Stage 1." Available: https://portal.3gpp.org/desktopmodules/Specifications/SpecificationDetails.aspx?specificationId=2897
[11] 3GPP TS 36.211 version 15.0.0, "Evolved Universal Terrestrial Radio Access (E-UTRA); Physical channels and modulation." Available: https://portal.3gpp.org/desktopmodules/Specifications/SpecificationDetails.aspx?specificationId=2425
[12] 3GPP TS 36.101 version 15.1.0, "Evolved Universal Terrestrial Radio Access (E-UTRA); User Equipment (UE) radio transmission and reception." Available: https://portal.3gpp.org/desktopmodules/Specifications/SpecificationDetails.aspx?specificationId=2411
[13] T. S. Rappaport, Wireless Communications: Principles and Practice. Upper Saddle River, N.J.: Prentice-Hall, 1996.
[14] S. Sesia, I. Toufik, and M. Baker, LTE-The UMTS Long Term Evolution: From Theory to Practice. New York: Wiley, 2009.
[15] F. Capozzi, G. Piro, L. Grieco, G. Boggia, and P. Camarda, "Downlink packet scheduling in LTE cellular networks: Key design issues and a survey," IEEE Communications Surveys and Tutorials, vol. 15, no. 2, pp. 678-700, July 2013.
[16] O. Grondalen, A. Zanella, K. Mahmood, M. Carpin, J. Rasool, and O. Osterbo, "Scheduling policies in time and frequency domains for LTE downlink channel: a performance comparison," IEEE Transactions on Vehicular Technology, vol. 66, no. 4, pp. 3345-3360, April 2017.
[17] A. Stolyar, "On the asymptotic optimality of the gradient scheduling algorithm for multiuser throughput allocation," Operations Research, vol. 53, pp. 12-25, February 2005.
[18] D. Tse, "Multiuser diversity in wireless networks: smart scheduling, dumb antennas and epidemic communication," in IMA Workshop on Wireless Networks, 2001. Available: https://web.stanford.edu/~dntse/papers/ima810.pdf
[19] R. Kwan, C. Leung, and J. Zhang, "Proportional fair multiuser scheduling in LTE," IEEE Signal Processing Letters, vol. 16, pp. 461-464, June 2009.
[20] S. B. Lee, S. Choudhury, A. Khoshnevis, S. Xu, and S. Lu, "Downlink MIMO with frequency-domain packet scheduling for 3GPP LTE," in Proc. IEEE INFOCOM, pp. 1269-1277, April 2009, Rio de Janeiro, Brazil.
[21] H. Zhang, N. Prasad, and S. Rangarajan, "MIMO downlink scheduling in LTE systems," in Proc. IEEE INFOCOM, pp. 2936-2940, March 2012, Olando, Fla., USA.
[22] H. S. Liao, P. Y. Chen, and W. T. Chen, "An efficient downlink radio resource allocation with carrier aggregation in LTE-Advanced networks," IEEE Transactions on Mobile Computing, vol. 13, no. 10, pp. 2229-2239, October 2014.

[23] S. Han, K. Jang, K. Park, and S. Moon, "PacketShader: a GPU-accelerated software router," in Proc. ACM SIGCOMM, pp. 195-206, August 2010, New Delhi, India.

[24] F. Fusco, M. Vlachos, X. Dimitropoulos, and L. Deri, "Indexing million of packets per second using GPUs," in Proc. of the 2013 Internet Measurement Conference, pp. 327-332, October 2013, Barcelona, Spain.

[25] M. Varvello, R. Laufer, F. Zhang, and T. V. Lakshman, "Multilayer packet classification with graphics processing units," IEEE Transactions on Networking, vol. 24, no. 5, pp. 2728-2741, October 2016.

[26] S. Roger, C. Ramiro, A. Gonzalez, V. Almenar, and A. M. Vidal, "Fully parallel GPU implementation of a fixed-complexity soft-output MIMO detector," IEEE Transactions on Vehicular Technology, vol. 61, no. 8, pp. 3796-3800, October 2012.

[27] Y. Zhao and F. Lau, "Implementation of decoders for LDPC block codes and LDPC convolutional codes based on GPUs," IEEE Transactions on Parallel and Distributed Systems, vol. 25, no. 3, pp. 663-672, March 2014.

[28] A. Li, R. G. Maunder, B. M. Al-Hashimi, and L. Hanzo, "Implementation of a fully-parallel turbo decoder on a general-purpose graphics processing unit," IEEE Access, vol. 4, pp. 5624-5639, June 2016.

[29] H. D. Sherali and W. P. Adams, A Reformulation-Linearization Technique for Solving Discrete and Continuous Nonconvex Problems, Chapter 8. Kluwer Academic Publishers, 1999.

[30] E. G. Talbi, Metaheuristics: From Design to Implementation. Hoboken, N.J., USA: Wiley, 2009.

[31] Nvidia, "Data sheet: Quadro P6000." Available: https://images.nvidia.com/content/pdf/quadro/data-sheets/192152-NV-DS-Quadro-P6000-US-12Sept-NV-FNL-WEB.pdf

[32] Nvidia, "CUDA C programming guide v9.1." Available: http://docs.nvidia.com/cuda/cuda-c-programming-guide/index.html

[33] W. Yang, G. Durisi, and E. Riegler, "On the capacity of large-MIMO block-fading channels," IEEE Journal on Selected Areas in Communications, vol. 31, no. 2, pp. 117-132, February 2013.

[34] Nvidia, "Nvidia Tesla P100—The most advanced data center accelerator ever built." Available: https://images.nvidia.com/content/pdf/tesla/whitepaper/pascal-architecture-whitepaper.pdf

[35] F. Zhang, J. Zhai, B. He, S. Zhang, and W. Chen, "Understanding co-running behaviors on integrated CPU/GPU architectures," IEEE Transactions on Parallel and Distributed Systems, vol. 28, no. 3, pp. 905-918, March 2017.

[36] M. Daga, M. Nutter, and M. Meswani, "Efficient breadth-first search on a heterogeneous processor," in Proc. IEEE International Conference on Big Data, pp. 373-382, October 2014, Washington D.C., USA.

[37] Intel, "The compute architecture of Intel Processor Graphics Gen7.5." Available: https://software.intel.com/sites/default/files/managed/4f/e0/Compute_Architecture_of_Intel_Processor_Graphics_Gen7dot5_Aug4_2014.pdf

What is claimed is:

1. A system for scheduling resources comprising:
a network, one or more cellular base stations, one or more networked many-core computing devices located at each base station, a plurality of parallel processing cores at the one or more computing devices, wherein each of the one or more cellular base stations finds an optimal or near-optimal solution within approximately 100 µs to a scheduling of resources for a plurality of users in the network by:
decomposing an original problem into a plurality of small and mutually independent sub-problems, wherein the sub-problems are solvable in less than approximately 100 µs;
choosing and generating a subset from the plurality of sub-problems at the one or more computing devices independently and in parallel, wherein the number of generated sub-problems fits the available number of parallel processing cores at the one or more computing devices;
solving each of the generated subset of sub-problems using the parallel processing cores at the one or more computing devices independently and in parallel;
calculating an objective value of each of the solved sub-problems using the parallel processing cores at the one or more computing devices independently and in parallel; and
determining an extreme objective value among all solved sub-problems at the one or more computing devices, wherein the solution to the sub-problem with the extreme objective value is set as the optimal or near-optimal solution, and wherein the said optimal or near-optimal solution is obtained prior to being used for resource scheduling,
wherein the system further comprises consecutive transmission time intervals (TTIs), wherein at each TTI:
a scheduling solution for the next TTI is determined;
operations related to the determination of the scheduling solution for the next TTI are completed, said operations comprising:
transferring input data to the one or more computing devices; computing the optimal or near-optimal solution at the one or more computing devices through parallel processing; and
transferring the optimal or near-optimal solution to its application at the base station;
wherein the base station applies the optimal or near-optimal solution determined in the previous TTI to schedule the transmissions to/from the plurality of users within the TTI;
wherein the input data to the one or more computing devices includes a number of users in the network, an amount of available resources, information from the users' channel quality indication (CQI) reports, and the users' past average data throughput.

2. The system of claim 1, wherein the resources are radio resources such as resource blocks (RB) comprised of transmissions in time and/or frequency domains and modulation and coding scheme (MCS) used for transmission to/from each user.

3. The system of claim 1, where the network is a cellular network such as 5G NR, 4G LTE, or 4G LTE-Advanced.

4. The system of claim 1, where the one or more computing devices are at least one of: a Graphics Processing Unit (GPU), Field-Programmable Gate Array (FPGA), and Application-Specific Integrated Circuit (ASIC).

5. The system of claim 1, wherein parallel processing cores are from one or more many-core computing devices such as one or more GPUs.

6. The system of claim 1, wherein the scheduling solution comprises an assignment of values to all variables, such as MCS and RB assignments for the plurality of users.

7. The system of claim 1, wherein a total processing time for finding the optimal or near-optimal solution meets a real-time requirement of the network.

8. The system of claim 1, where the optimal or near-optimal) scheduling solution is tied to the outcome of solving a mathematical program such as a mixed-integer linear program (MILP).

9. The system of claim 1, wherein for the problem decomposition:
   each sub-problem is of much smaller size than the original problem;
   each sub-problem is generated by fixing a subset of variables in the original problem such as fixing a choice of modulation and coding scheme (MCS) for each user;
   the sub-problems are purposefully made to be mutually independent;
   the solution to each sub-problem requires the same small number of calculations; and
   the solution to each sub-problem meets all the constraints in the original problem.

10. The system of claim 1, wherein the number of sub-problems to be generated is to be fitted into the total number of parallel processing cores at the one or more computing devices.

11. The system of claim 10, wherein a sub-set of the number of sub-problems to be generated are chosen from the most promising search space of the original problem.

12. The system of claim 11, wherein the system employs techniques including intensification to identify the most promising search space and random sampling to generate the sub-problems, wherein:
   the intensification technique refers to restricting the selection of values for certain variables in the original problem to a subset of all possible values for the said variables, such as restricting the selection of MCS for each user to a subset of all possible MCSs;
   the random sampling technique refers to randomly choosing values for certain variables in the original problem from the subset of values for the said variables after intensification, such as randomly choosing an MCS for each user from the subset of MCSs after intensification subject to a probability distribution such as but not limited to uniform distribution; and
   each sub-problem is generated by fixing certain variables in the original problem through random sampling after applying intensification to the original problem.

13. The system of claim 12, wherein the generation of sub-problems at the one or more computing devices is done independently and in parallel.

14. The system of claim 1, wherein solving each sub-problem refers to determining the optimal or near-optimal values of the remaining variables in each sub-problem, such as allocating RBs for transmissions to/from the plurality of users.

15. The system of claim 14, wherein the sub-problems are solved independently and in parallel using the parallel processing cores at the one or more computing devices.

16. The method of claim 9, wherein K/P sub-problems are generated for each thread block, wherein K represents a total number of sub-problems generated at the one or more computing devices, and P represents the total number of thread blocks at the one or more computing devices.

* * * * *